US009519706B2

(12) United States Patent
Luke

(10) Patent No.: US 9,519,706 B2
(45) Date of Patent: Dec. 13, 2016

(54) MULTIPLE RULE DEVELOPMENT SUPPORT FOR TEXT ANALYTICS

(75) Inventor: James S. Luke, Isle of Wight (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 586 days.

(21) Appl. No.: 13/306,054

(22) Filed: Nov. 29, 2011

(65) Prior Publication Data

US 2013/0138425 A1    May 30, 2013

(51) Int. Cl.
*G06F 17/30*    (2006.01)
*G06F 17/27*    (2006.01)

(52) U.S. Cl.
CPC ..... *G06F 17/30716* (2013.01); *G06F 17/2705* (2013.01); *G06F 17/277* (2013.01)

(58) Field of Classification Search
CPC ........................... G06F 17/27; G06F 17/30716
USPC ......................................................... 715/256
See application file for complete search history.

(56) References Cited

U.S. PATENT DOCUMENTS

| | | | |
|---|---|---|---|
| 7,461,056 B2 | 12/2008 | Cao et al. | |
| 7,657,495 B2 | 2/2010 | Hunter et al. | |
| 7,689,557 B2 | 3/2010 | Pandit et al. | |
| 7,912,701 B1 * | 3/2011 | Gray et al. | 704/9 |
| 8,166,051 B1 * | 4/2012 | Bauer et al. | 707/750 |
| 2002/0016707 A1 * | 2/2002 | Devoino et al. | 703/22 |
| 2004/0107088 A1 * | 6/2004 | Budzinski | 704/10 |
| 2007/0179776 A1 * | 8/2007 | Segond | G06F 17/2247 704/9 |
| 2009/0248399 A1 * | 10/2009 | Au | 704/9 |
| 2009/0248400 A1 | 10/2009 | Luke | |
| 2009/0265339 A1 | 10/2009 | Chen et al. | |
| 2009/0271406 A1 | 10/2009 | Wong et al. | |
| 2011/0035211 A1 * | 2/2011 | Eden | G06F 17/2735 704/10 |
| 2011/0047159 A1 | 2/2011 | Baid et al. | |
| 2012/0254802 A1 * | 10/2012 | Tinkler | G06F 17/2735 715/830 |

OTHER PUBLICATIONS

Alf Eaton, A Modular System for Automatic Entity Extraction and Manual Annotation of Academic Papers, Feb. 3, 2011, Alf Eaton, p. 1 and 2.*

(Continued)

*Primary Examiner* — Scott Baderman
*Assistant Examiner* — Seung Jung
(74) *Attorney, Agent, or Firm* — Terry J. Carroll; Edell, Shapiro & Finnan, LLC

(57) ABSTRACT

Methods, computer program products and systems are provided for applying text analytics rules to a corpus of documents. The embodiments facilitate selection of a document from the corpus within a graphical user interface (GUI), where the GUI opens the selected document to display text of the selected document and also a token parse tree that lists tokens associated with text components of the document, facilitate construction of a text analytics rule, via the GUI, by user selection of one or more tokens from the token parse tree, and, in response to a user selecting one or more tokens from the token parse tree, provide a list of hits via the GUI, the hits including a listing of text components from documents of the corpus that are associated with tokens that comply with the constructed text analytics rule.

23 Claims, 26 Drawing Sheets

(56) References Cited

OTHER PUBLICATIONS

Text Analysis International, Parse Tree, Oct. 21, 2011, captured from Wayback Machine for http://www.textanalysis.com/parse_trees.htm, p. 1.*
Appelt et al., SRI International FASTUS System MUC-6 Test Results and Analysis, 1995, Proceedings of the 6th Conference on Message Understanding, pp. 237-248.*
SAS Institute Inc., Getting Started with SAS® Text Miner 4.2, Nov. 15, 2010, SAS Institute Inc., p. 1-24.*
Text Analysis International Inc., "Integrated Development Environments for Natural Language Processing", Sunnyvale, CA, Oct. 2001, (13 pages).
http://www.textanalysis.com/Products/Quick_Tour/GUI/gui.html, Visual Text, Apr. 29, 2011, (2 pages).

* cited by examiner

MULTIPLE RULE DEVELOPMENT SUPPORT FOR TEXT ANALYTICS

BACKGROUND

1. Technical Field

The present invention relates to the field of text analytics.

2. Discussion of the Related Art

Text analytic solutions involve the process of annotating data within natural language documents with information. The annotations allow a text analytics application to scan information written in a natural language in order to extract information and populate a database or search index with the extracted information. Information is extracted from a document according to a set of rules defined in the text analytics application. Text analytic applications typically comprise two types of rules. The first type is dictionary rules, which define annotations that should be applied whenever a specified phrase is encountered. For example, the phrase 'International Business Machines' should be annotated as an 'Organisation'. The second type is grammatical rules, which define the annotations that should be applied whenever a grammatical pattern is encountered. For example, in a grammatical pattern comprising the phrase 'member of' followed by any 'Name', the 'Name' annotation should be changed to an 'Organisation' annotation. In another example, a grammatical pattern comprising a 'Name' followed by a 'Verb' followed by a 'Name' can be extracted into a Subject-Object-Predicate triple for use in a semantic knowledge base When presented with a test corpus of documents, text analytics applications are designed to identify those parts of the document that will cause a rule to be triggered. For example, the need to identify the occurrence of dictionary terms within a document would trigger dictionary rules when the text analytics application scans the document and locates a dictionary term.

When working with existing analytics rule development tools, the rule developer typically faces certain challenges, including: (1) ensuring that all phrases and/or variants of text that are the subject of a search are found; (2) identifying and resolving conflicts between two or more rules applied to the document or text corpus during a search; and (3) understanding the impact of a rule change to the overall performance of the analytics rule development tool.

BRIEF SUMMARY

Accordingly, embodiments of the present invention include a method, a computer program product and a system for applying text analytics rules to a corpus of documents, comprises facilitating selection of a document from the corpus within a graphical user interface (GUI), where the GUI opens the selected document to display text of the selected document and also a token parse tree that lists tokens associated with text components of the document, facilitating construction of a text analytics rule, via the GUI, by user selection of one or more tokens from the token parse tree, and, in response to a user selecting one or more tokens from the token parse tree, providing a list of hits via the GUI, the hits including a listing of text components from documents of the corpus that are associated with tokens that comply with the constructed text analytics rule.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE SEVERAL VIEWS OF THE DRAWINGS

FIGS. 8-21 depict GUI images showing features of the GUI for analyzing and revising rule tokens utilizing the GUI generator component in accordance with an example embodiment of the invention.

DETAILED DESCRIPTION

In an example embodiment of the present invention, a computer system is provided in which operation of improved text analytic applications may be implemented that facilitate incorporation of rule changes utilizing a parse tree combined with a document editor in a single GUI.

The combination of a document editor (which includes listings of documents of interest from the corpus of documents to be searched) with a rule parse tree in a single graphical user interface allows a user to develop and modify rules while observing in real time the results of the rules in the form of hits obtained in the same GUI.

Figure 1:
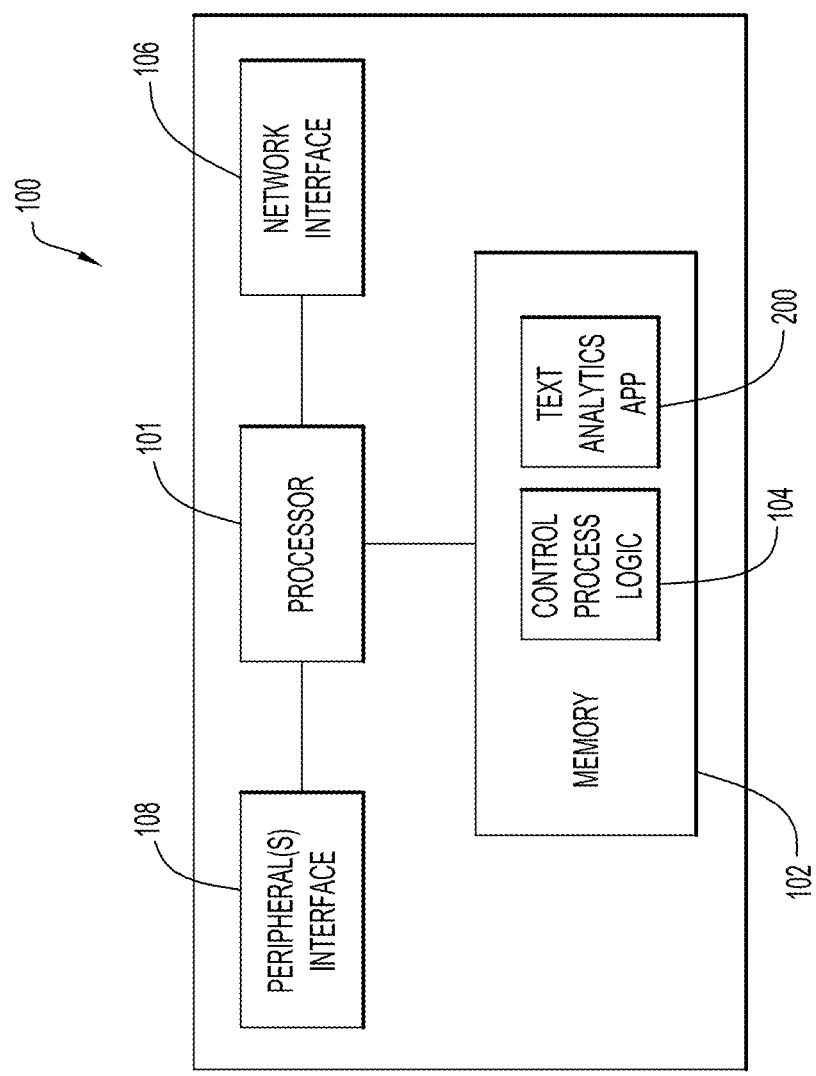
FIG. 1 is a diagrammatic illustration of an example computer system in accordance with an example embodiment of the present invention.

As depicted in FIG. 1, a computer system 100 includes a central processing unit or processor 101 with primary storage in the form of memory 102 (RAM and ROM). The memory 102 includes control process logic 104 including the operating system code for the computer system 100 and application code for applications running on the computer system 100. The memory 102 further includes a text analytic application 200 that includes program instructions that are executed by the control process logic 104 to perform the operations of implementing text analytic rules and providing search results along with a parse tree and access to each document within the document corpus within a single GUI as described herein. The computer system can also include additional or secondary storage (e.g., optical and/or magnetic disk storage). Data and program information can also be stored and accessed from the secondary storage.

The computer system 100 also includes a network interface 106 to facilitate connection of the computer system 100 to a network (e.g., a local area network (LAN) or the Internet) utilizing any internal and/or external hardware associated with the computer system 100. For example, the computer system 100 may access one or more databases that contain the document or text corpus (i.e., the entire listing of and access to text documents) that are subject to the search utilizing the text analytic application 200. The computer system 100 further includes one or more peripheral interfaces 108 which facilitate a connection (e.g., a wired or wireless connection) to any suitable number of peripherals (e.g., keyboard, mouse, display, scanner, printer, etc.) that facilitate input of data to the computer system 100 and output of data, including output information in the form of a GUI as described herein utilizing the text analytic application 200, during operation of the computer system 100.

The computer system 100 is not limited to any type of data processing system or apparatus, and may be a conventional desktop or lap-top personal computer, a personal digital assistant or a mobile phone or any other specialized data processing device, which is capable of running text analytic application 200.

Figure 2:
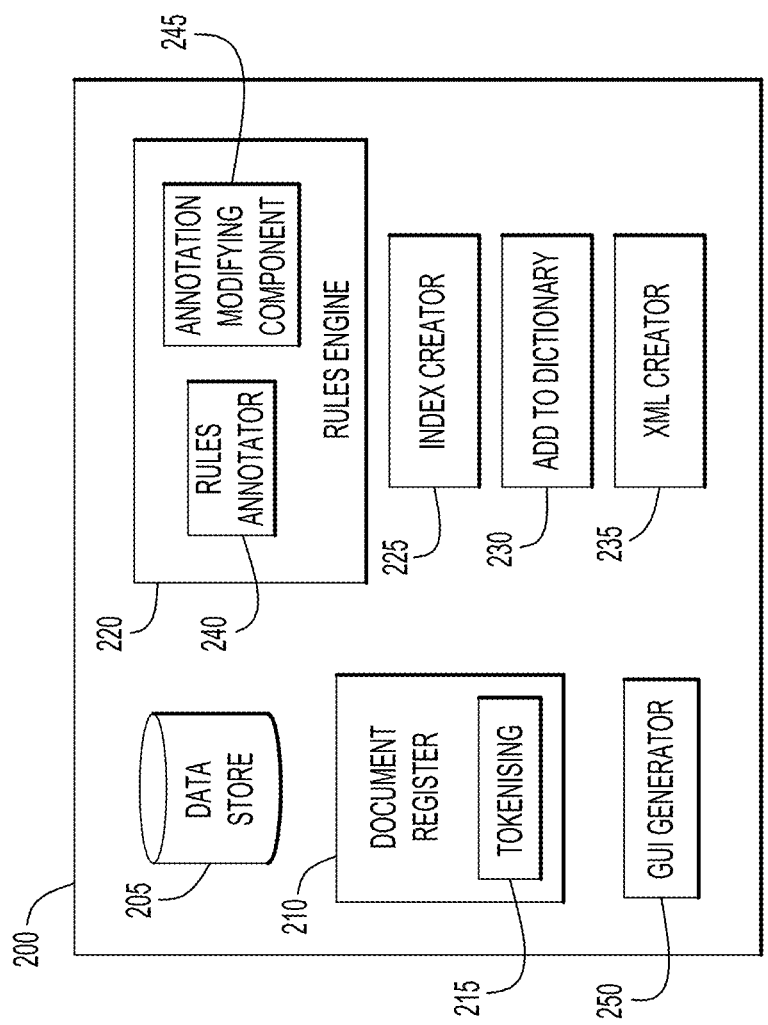
FIG. 2 is a block diagram depicting components of the text analytic application used by the computer system of FIG. 1.

FIG. 2 shows a block diagram of the components of the text analytic application 200 that is used by the computer system 100, where the components comprise a data store 205 to store a plurality of natural language documents which have been registered with the text analytic application, an annotation array and an index created by an index creator component 225, a document register component 210 to register a natural language document with the text analytics application, where the document register 210 includes a tokenizing component 215 to parse each registered document in order to generate a reference to each individual word, number and/or punctuation mark in an index, an index creator component 225 to create an index of references of each identified word, number and/or punctuation mark, an XML creator component 235 to create an XML representation of the index, an add to dictionary component 230 to add dictionary rules and a rules engine component 220 comprising dictionary rules and further comprising a rules annotator component 240 and an annotation modifying component 245 to determine the existence of a tokenized item in an index and modify an annotation in an annotations array in response to a tokenized item being found in the tokenized array. The application 200 further includes a GUI generator component 250 that generates a GUI including a window that selectively displays a copy of each document for review, an editable parse tree that can be used to modify search rules for the document corpus, and also a listing of search results or "hits" that are obtained from the document corpus based upon applied rules (e.g., as modified by editing the parse tree displayed within the GUI).

An example type of a document registered with the text analytic application 200 is a document written in a natural language. However, it will be appreciated by a person skilled in the art that any form of document comprising unstructured text may be registered with the text analytic application 200.

The document register component 210 logs the name of the document which is to be analyzed by the text analytic application 200. The document register component 210 stores the received document in the data store 205. Each stored document is tokenized by the tokenizing component 215 to identify individual words, numbers and punctuation marks. During tokenization, the index creator component 225 in combination with the rules engine component 225 creates a reference to each individual word and adds this to an index created by the index creator component 225. The index comprises a list of all the words encountered together with a list of references for each word. In addition, the index stores the initial annotation for each word determined by dictionary rules as defined by the rules engine. Some example default annotations include Alpha for words, Numeric for numbers and Punt for punctuation.

Figure 3:
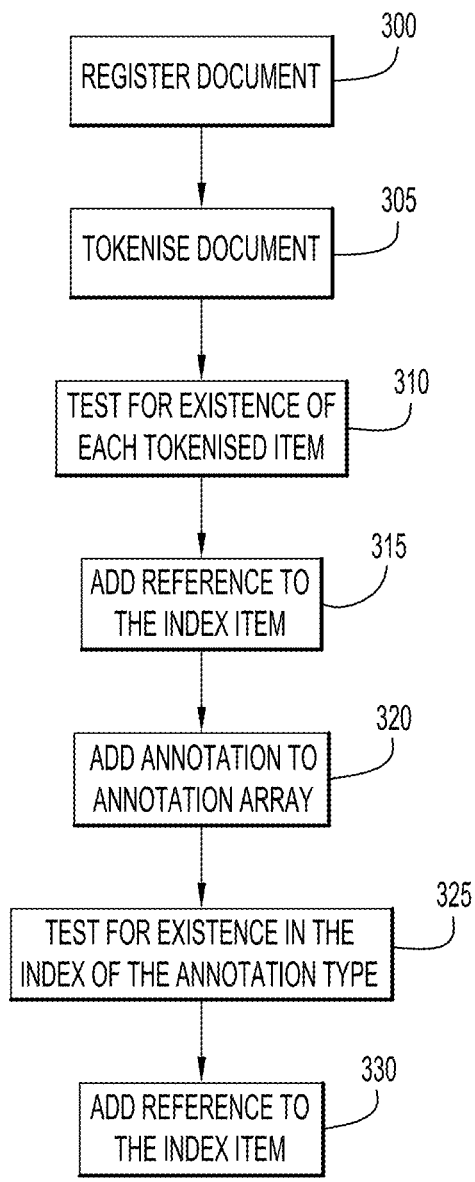
FIG. 3 is a flow chart depicting operational steps of registering a document with the text analytic application of FIG. 2 in accordance with an example embodiment of the present invention.
Figure 4:
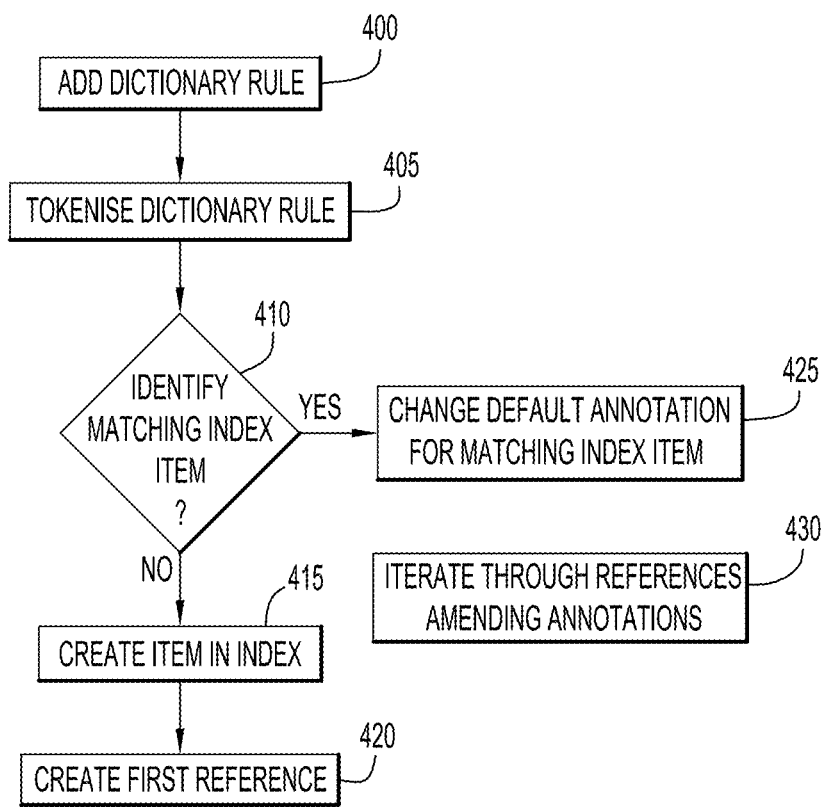
FIG. 4 is a flow chart depicting operational steps of adding a single word dictionary rule to the text analytic application of FIG. 2 in accordance with an example embodiment of the invention.
Figure 5:
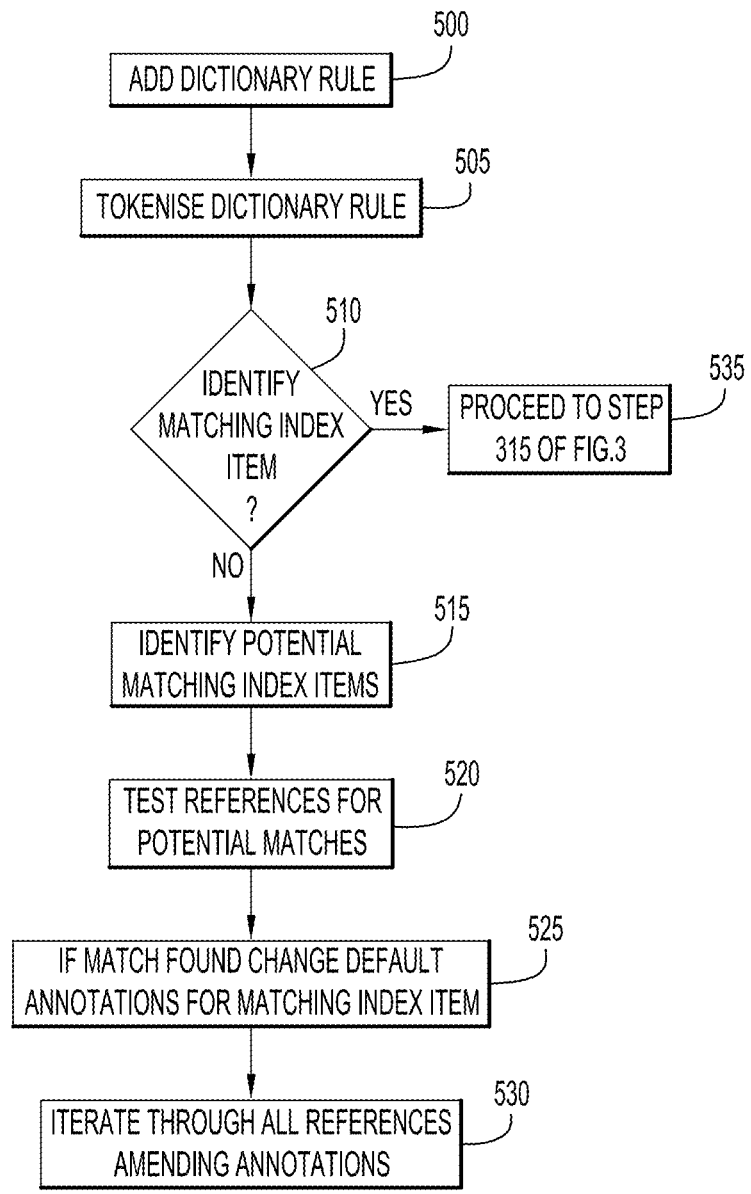
FIG. 5 is a flow chart depicting operational steps of adding a multiple word rule to the text analytic application of FIG. 2 in accordance with an example embodiment of the invention.

The description of the operation of the text analytics application 200 will be based on an example corpus of three documents and should be read in conjunction with FIGS. 3 to 5:

Document One:
John called Smith about John Smith.
Document Two:
Smith worked for John Smith, the IT company.
Document Three:
John Smith was owned by John.

Document One and Document Two are registered with the text analytics application 200 by the document register component 210 (step 300). On registration, each document is tokenized by the tokenizing component 215 to identify individual words, numbers and punctuation marks (step 305). During tokenization, a reference to each individual word is added to the index by the index creator component 225 (step 310). The index comprises a list of all the words encountered to date together with a list of references for each word (step 315). In addition, the index stores the initial annotation for each word determined by dictionary rules. The default annotations are Alpha for words, Numeric for numbers and Punt for punctuation.

In addition to creating index references, the index creator component 225 creates an array of annotations for Document one and two (step 320). Each annotation is indexed meaning that the index includes a list of reference for each annotation. The index and annotation data structures, together with the data structures storing the original document, are fully cross referenced (step 325 and 330). This ensures that it is possible to rapidly identify all occurrences of a particular word or annotation. The rules annotator component 240 identifies the word associated with any particular annotation or the annotation associated with a word. This cross referencing is hierarchical such that it is possible to identify the full hierarchy of annotations for a particular word and vice versa.

In the example below the default annotations are shown for Document one by calling the XML creator component 235. The XML returned by the XML creator component 235 is as follows:

```
<Document>
<Alpha Value="John" Start="0" Length="4"/>
<White Value=" " Start="4" Length="1"/>
<Alpha Value="called" Start="5" Length="6"/>
<White Value=" " Start="11" Length="1"/>
<Alpha Value="Smith" Start="12" Length="5"/>
<White Value=" " Start=" 17" Length="1"/>
<Alpha Value="about" Start="18" Length="5"/>
```

```
        <White Value=" " Start="23" Length="1"/>
        <Alpha Value="John" Start="24" Length="4"/>
        <White Value=" " Start=" 28" Length="1"/>
        <Alpha Value="Smith" Start="29" Length="5"/>
        <Punct Value="." Start="34" Length="1"/>
    </Document>
```

The XML for the second example document is:

```
    <Document>
        <Alpha Value="Smith" Start="0" Length="5"/>
        <White Value=" " Start="5" Length="1"/>
        <Alpha Value="worked" Start="6" Length="6"/>
        <White Value=" " Start="12" Length="1"/>
        <Alpha Value="for" Start="13" Length="3"/>
        <White Value=" " Start="16" Length="1"/>
        <Alpha Value="John" Start="17" Length="4"/>
        <White Value=" " Start="21" Length="1"/>
        <Alpha Value="Smith" Start="22" Length="5"/>
        <Punct Value="," Start="27" Length="1"/>
        <White Value=" " Start="28" Length="1"/>
        <Alpha Value="the" Start="29" Length="3"/>
        <White Value=" " Start="32" Length="1"/>
        <Alpha Value="IT" Start="33" Length="2"/>
        <White Value=" " Start="35" Length="1"/>
        <Alpha Value=" company" Start="36 " Length="7"/>
        <Punct Value="." Start="43" Length="1"/>
        <White Value=" " Start="44" Length="1"/>
    </Document>
```

A new dictionary rule can be added or an existing dictionary rule revised for the text analytic application by the add to dictionary component 230. Any number of rules can be added/revised in relation to the dictionary. An example of a rule is that the word 'Smith' is a 'Name'. Adding this dictionary rule results in the following:
1. The index creator component 225 performs a check function on the index to determine if there are any references to the term 'Smith' in any of the registered documents (steps 400 to 405 and 410).
2. If the determination is positive, the default annotation is changed from 'Alpha' to 'Name' by the annotation modifying component 245. Note that a particular word or phrase can have only a single default annotation (step 425).
3. The annotation modifying component 245 iterates through all index references for the term 'Smith' and changes the corresponding annotation references, previously 'Alpha', to the new 'Name' annotation (step 430).
4. If the determination is negative, the item is created in the index by the index creator component 225 and a reference is added to the index (steps 415 and 420).

Following the addition of the above dictionary rule the annotated XML for Document one, as generated by the XML creator component is:

```
            <Document>
            <Alpha Value="John" Start="0" Length="4"/>
            <White Value=" " Start="4" Length="1"/>
            <Alpha Value="called" Start="5" Length="6"/>
            <White Value=" " Start="11" Length="1"/>
            <Name Value="Smith" Start="12" Length="5"/>
            <White Value=" " Start="17" Length="1"/>
            <Alpha Value="about" Start="18" Length="5"/>
            <White Value=" " Start="23" Length="1"/>
            <Alpha Value="John" Start="24" Length="4"/>
            <White Value=" " Start="28" Length="1"/>
            <Name Value="Smith" Start="29" Length="5"/>
            <Punct Value="." Start="34" Length="1"/>
        </Document>
```

The XML created by the XML creator component 225 for Document Two is as follows:

```
        <Document>
            <Name Value="Smith" Start="0" Length="5"/>
            <White Value=" " Start="5" Length="1"/>
            <Alpha Value="worked" Start="6" Length="6"/>
            <White Value=" " Start="12" Length="1"/>
            <Alpha Value="for" Start="13" Length="3"/>
            <White Value=" " Start="16" Length="1"/>
            <Alpha Value="John" Start="17" Length="4"/>
            <White Value=" " Start="21" Length="1"/>
            <Name Value="Smith" Start="22" Length="5"/>
            <Punct Value="," Start="27" Length="1"/>
            <White Value=" " Start="28" Length="1"/>
            <Alpha Value="the" Start="29" Length="3"/>
            <White Value=" " Start="32" Length="1"/>
            <Alpha Value="IT" Start="33" Length="2"/>
            <White Value=" " Start="35" Length="1"/>
            <Alpha Value="company" Start="36" Length="7"/>
            <Punct Value="." Start="43" Length="1"/>
            <White Value=" " Start="44" Length="1"/>
        </Document>
```

Adding a further dictionary rule stating that 'John Smith' is an 'Organization' results in the following actions by the text analytic application 200:
1. The rules annotator component 240 performs a check function on the index to determine whether there are any existing references to 'John Smith'. The rules annotator component 240 identifies that there are no existing references to 'John Smith' and therefore a new index item is created in the index by the index creator component 245 (steps 500 to 535).
2. Using the same tokenization algorithms applied during document registration, the rules engine 220 identifies that the term 'John Smith' comprises multiple words (step 515).
3. The annotation modifying component 245 selects the first word, 'John', and uses the index to determine if any references exist for that term in any of the registered documents. If references are found the annotation modifying component 245 examines each reference in more detail to determine if they are part of the longer phrase 'John Smith' (step 520).
4. Similarly, annotation modifying component 245 selects the second word, 'Smith', and uses the index to determine if any references exist for that term in any of the registered documents. Again, if references are found the rules engine examines each reference in more detail to determine if they are part of the longer phrase, 'John Smith' (step 525).
5. If steps (3) or (4) above identify a matching phrase, the existing references to the individual words 'John' and 'Smith' are deleted and a new reference is added for the term 'John Smith'. The annotations array is also updated by the annotation modifying component 245 so that the existing annotations are replaced with a single new 'Organization' annotation (step to 530). The resulting XML for the first example document:

```
        <Document>
        <Alpha Value="John" Start="0" Length="4"/>
        <White Value=" " Start="4" Length="1"/>
        <Alpha Value="called" Start="5" Length="6"/>
        <White Value=" " Start="11" Length="1"/>
        <Name Value="Smith" Start="12" Length="5"/>
        <White Value=" " Start="17" Length="1"/>
        <Alpha Value="about" Start="18" Length="5"/>
        <White Value=" " Start="23" Length="1"/>
        <Organization Value="John Smith" Start="24" Length="10"/>
        <Punct Value="." Start="34" Length="1"/>
        <White Value=" " Start="35" Length="1"/>
    </Document>
```

The XML for Document Two is shown below:

```
<Document>
<Name Value="Smith" Start="0" Length="5"/>
<White Value=" " Start="5" Length="1"/>
<Alpha Value="worked" Start="6" Length="6"/>
<White Value=" " Start="12" Length=" 1"/>
<Alpha Value="for" Start="13" Length="3"/>
<White Value=" " Start="16" Length="1"/>
<Organization Value="John Smith" Start="17" Length="10"/>
<Punct Value="," Start="27" Length="1"/>
<White Value=" " Start="28" Length="1"/>
<Alpha Value="the" Start="29" Length="3"/>
<White Value=" " Start="32" Length="1"/>
<Alpha Value="IT" Start="33" Length="2"/>
<White Value=" " Start="35" Length="1"/>
<Alpha Value="company" Start="36" Length="7"/>
<Punct Value="." Start="43" Length="1"/>
<White Value=" " Start="44" Length="1"/>
</Document>
```

When a further document is registered, for example Document Three, the document is again tokenized by the tokenize component 215. As each individual word, in Document Three, is identified the index is searched to determine whether the word has already been included in the index. If the word has already been included in the index then the appropriate annotation is automatically applied, otherwise a new index item is created and the default annotation applied. If a word is identified as being the start of a multi-word term already in the index (e.g. 'John Smith') then the annotation modifying component 245 checks to see if the entire term exists; if so the appropriate annotation is applied.

Grammatical rules are applied by the text analytics application in exactly the same manner as dictionary rules, the only difference being that grammatical rules are more hierarchical. Consider a rule that states if a 'Verb' with the text value of 'works' followed by a 'Preposition' with the text value of 'for' followed by a 'Name', then the 'Name' annotation should be changed to an 'Organization' annotation.

On adding the rule to the text analytic application by the add to dictionary component 230, the index is immediately searched, by rules annotator component 240 to determine matching patterns. This involves multiple tests such as identifying every reference to the work 'works' and then testing whether that word has been annotated as a 'Verb'. If not, then the reference is ignored. The query is easily optimized as the index includes count data so it is possible to start the test with the minimum number of references. In other words, if the word 'for' appears less often than the word 'works', then this word is used as the start of the test as the search space is smaller and therefore faster.

As previously described, the index and the annotations array comprises a large number of cross references. The annotations array stored in the data store 205 comprises a hierarchical series of references. For example, consider the case where two rules have been created:
1. Rule 1 (Grammatical)—annotates any occurrence of a 'MaleName' as a 'Name'.
2. Rule 2 (Grammatical)—annotates any Organization that is preceded by the term 'works for' as an 'Employer'.
3. Rule 3 (Dictionary)—annotates the word 'John' as a 'MaleName'. For the text, 'John works for John Smith', the annotated XML would be:

```
<Document>
<Name Value="Smith" Start="0" Length="5"/>
<White Value=" " Start="5" Length="1"/>
<Alpha Value="works" Start="6" Length="6"/>
```

-continued

```
<White Value=" " Start="12" Length="1"/>
<Alpha Value="for" Start="13" Length="3"/>
<White Value=" " Start="16" Length="1"/>
<Name>
<MaleName Value="John" Start="17" Length="4"/>
</Name>
<White Value=" " Start="21" Length="1"/>
<Name Value="Smith" Start="22" Length="5"/>
</Document>
```

In the event that a new dictionary rule is added stating that 'John Smith' is an 'Organization', the index and annotations array are updated as described previously. However, when the 'MaleName' annotation is deleted, all related hierarchical annotations are also deleted. This means that the annotation itself is deleted from the annotations array and the reference to the annotation is deleted from the index array. In this case, the 'Name' annotation above the 'MaleName' annotation is deleted.

Having deleted the 'Name' and 'MaleName' annotations by the rules annotation component, the new Organization annotation is added to the index. An event is sent to the rules engine component 220 stating that a new reference to an annotation has been added to the index. The annotation modifying component 245 identifies any existing rules that include an 'Organization' as part of the input. In this case, Rule 2 would be identified. The rules engine component 220 uses the index, annotation and document cross referencing in more detail to determine if the rule input pattern exists. If so, the new annotation is inserted and a further event is generated. This process is cascaded until no further rules trigger.

Thus, the system 100 utilizes the text analytic application 200 to identify a word or word phrases (e.g., specific combinations of two or more words) so as to facilitate specific word or phrase searches over a corpus of text documents (e.g., hundred, thousands or even millions of documents) in order to easily identify documents that may be of interest. The embodiments of the present invention build upon this rule based system 100 by providing a graphical user interface (GUI), via the GUI generator 250 of the application 200, that facilitates easy addition/modification and testing of rules generated by the application 200 on documents within the document corpus. It does all of this by allowing the operator to make a rule change (by making modifications to a token parse tree displayed by the GUI) and to immediately see how the rule change impacts or is applicable to the document corpus, all within a single interface.

Figure 6:
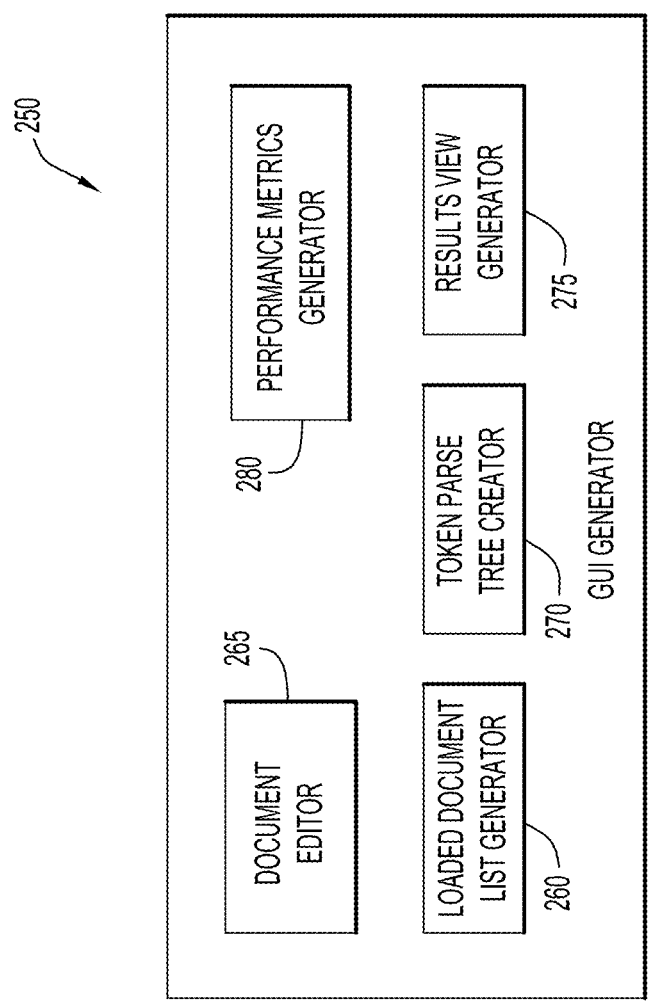
FIG. 6 is a block diagram depicting components of the GUI generator component of the text analytic application of FIG. 2 in accordance with an example embodiment of the invention.

An example embodiment of the GUI generator component 250 is depicted in FIG. 6 and includes a loaded document list generator component 260, a document editor component 265, a token parse tree creator component 270, a results view generator component 275, and a coverage metrics generator component 280. The GUI that is created and operated by the system 100 utilizing the GUI generator 250 provides useful features to a user working with the document corpus in that it allows the user to ensure that phrases and variants in phrases of the text of documents are found, to identify and resolve conflicts between rules, and to understand the impact of a rule change to the document corpus.

Figure 8:
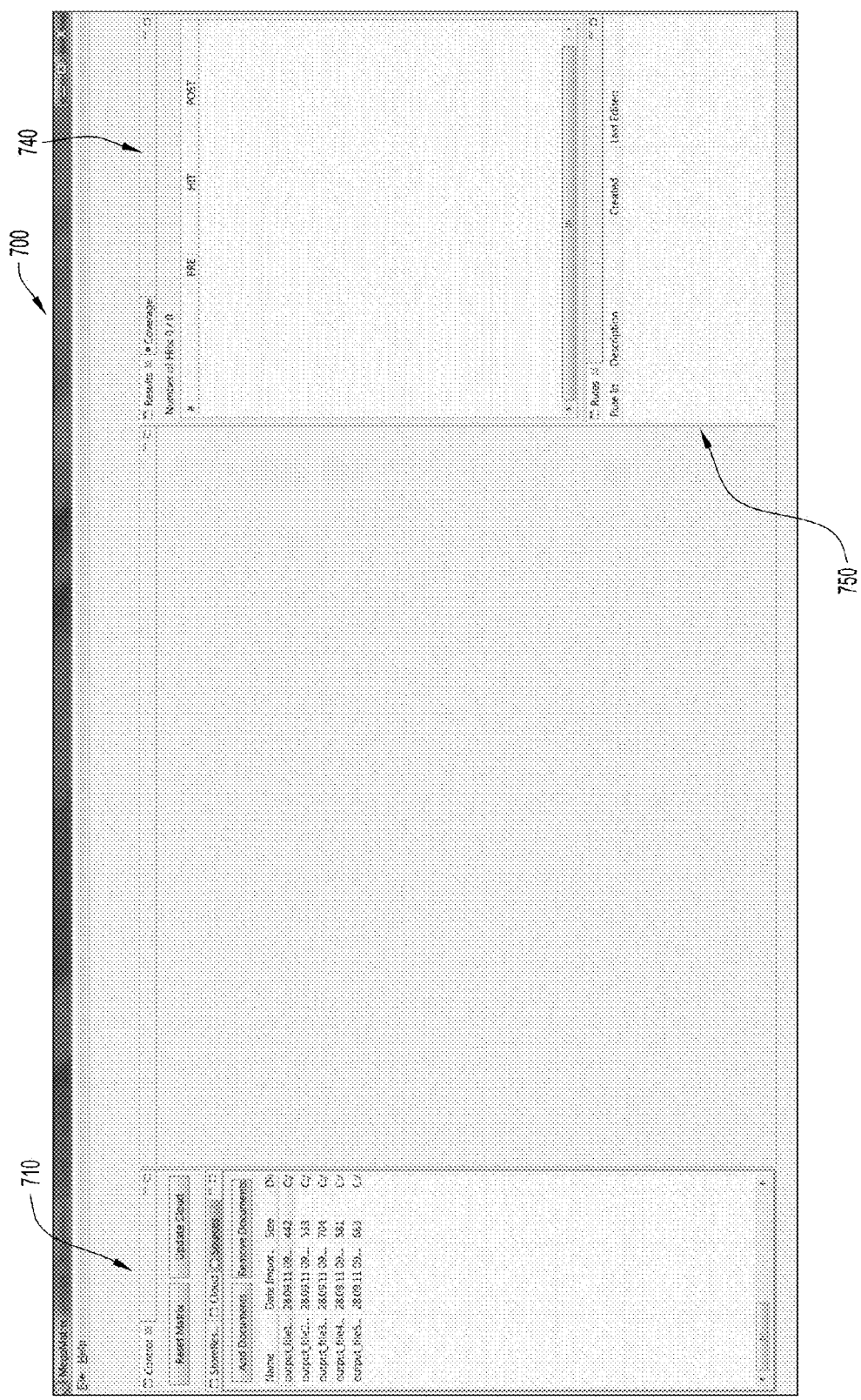

The GUI generator component 250 generates a GUI 700 in the form of images that are displayed by the system 100, such as the GUI images depicted in FIGS. 8-21. In particular, the GUI 700 includes a plurality of windows providing information about the document corpus and rules including tokens that are displayed in a parse tree. A document list window 710 displays a listing of text files that are generated by the document list generator component 260 (e.g., 5 document files as shown in FIG. 8) that may be loaded by the system 100 for analysis by the application 200 at any given time. The document list window 710 can include one or more interactive buttons (e.g., the "Source" button, the "Cloud" button and other buttons located at an upper portion of the window 710) that can be selected by the user (e.g., by clicking on the appropriate button using a mouse pointer) to select documents from one or more different sources (e.g., from different servers to which the system 100 may be coupled via a network, to files loaded by the system within memory 102, etc.). Such documents have been processed by registering and tokenizing the documents in the previously described manner.

Figure 9:
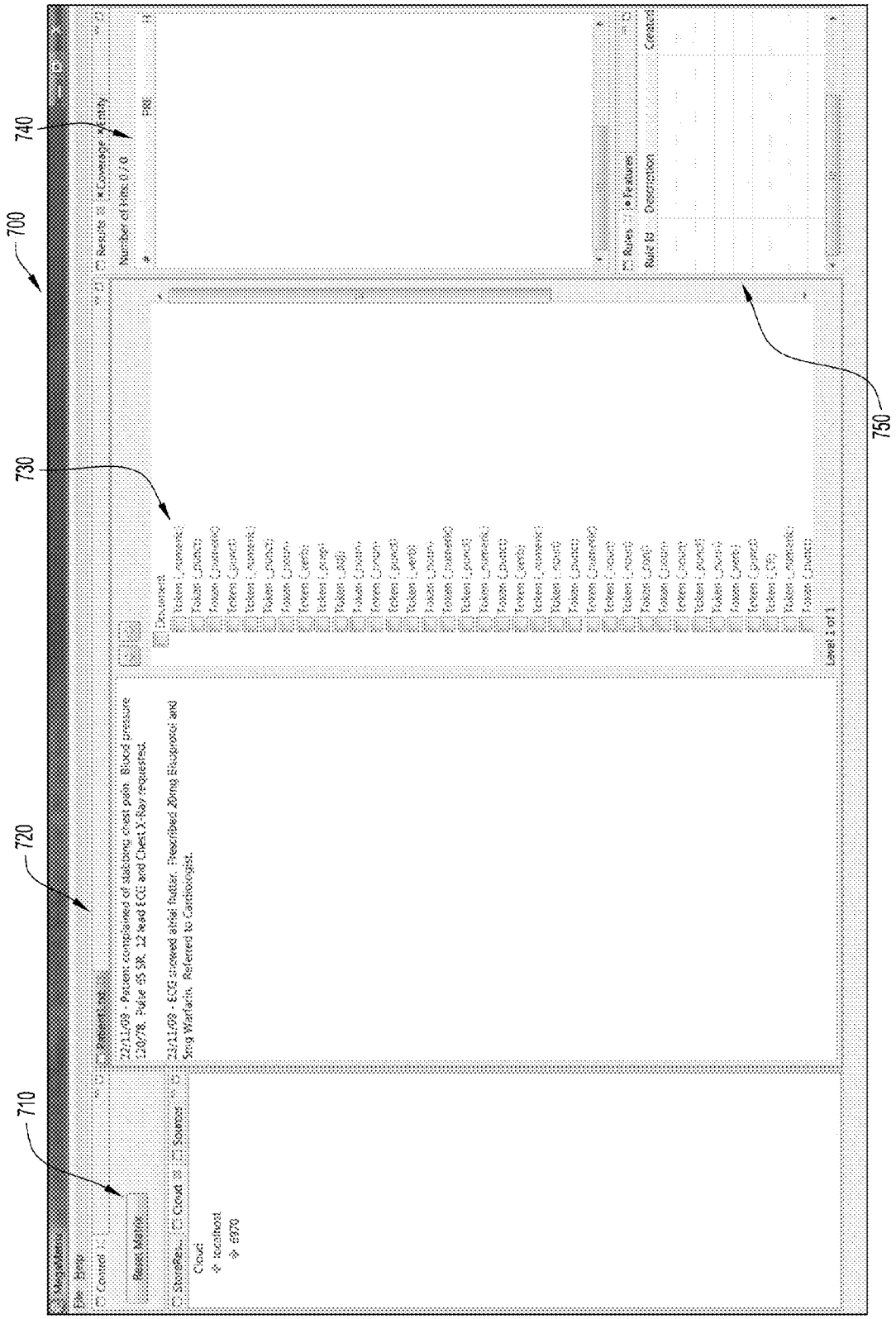

The GUI 700 is configured to allow the user to select a document from the document list window 710 (e.g., by clicking on the document via the mouse pointer). The result is that the document editor component 265 opens an editable version of the document in a document edit window 720 (e.g., as shown in FIG. 9, the document 'Patient1.txt' is open in window 720). One or more documents can also be open at a given instance in the document edit window 720 (see, e.g., FIG. 11), where buttons are provided at an upper location of the window 720 that can be selected by the user to display the text of the open document of interest (see, e.g., FIG. 12, in which documents 'Patient1.txt' and 'Patient3.txt' are open in window 720).

Upon opening a document for edit or display in the document edit window 720, a token parse tree window 730 displays a hierarchy or tree of parse tokens that correspond with text components (e.g., individual alphabetical text or words, numeric text, alphanumeric text, punctuation marks, white spaces, defined phrases, etc.) of the document displayed in the document edit window 720. As previously noted, the open document has already been registered and its text tokenized utilizing the various components 210, 220, 225, 230, 235 of the text analytic application 200. In particular, as previously noted, the XML creator component 235 generates an XML for the registered and tokenized document, including each token defining a rule for a word or phrase within the document. The token parse tree creator component 270 converts the XML into a hierarchical token parse tree (e.g., as shown in FIG. 9 for 'Patient1.txt'), where each token corresponds with a text component or phrase within the document. Each token can be expanded to show information about the text component (e.g., value, such as 'John', capitalization, length, node identification, starting point within document, etc.), where each piece of information is located at a token component or node with a corresponding button or box associated with each node that is selectable by the user (e.g., by the user clicking on the box with a mouse pointer) to select or "activate" a particular rule (see, e.g., FIG. 10). The user can further highlight a word or phrase of the open document within the document edit window 720, and this results in the token parse tree window 730 displaying an expanded version of the token or tokens associated with such highlighted word(s).

Figure 7:
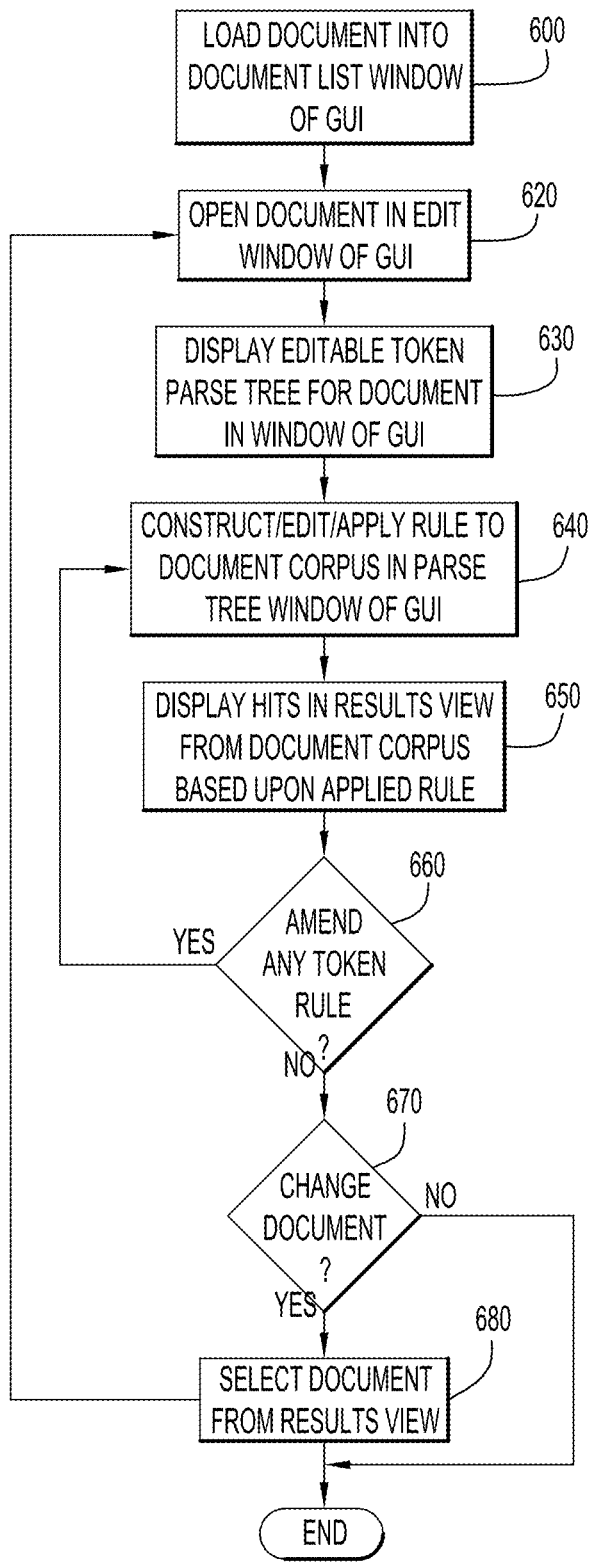
FIG. 7 is a flow chart depicting operational steps associated with applying and revising rules associated with documents combined with displaying search results based upon such rules utilizing the GUI generator component in accordance with an example embodiment of the invention.

Operation of the GUI generator component 250 to generate a GUI 700 having the features as described above is now described with reference to the flow chart of FIG. 7 and also FIGS. 8-21. Referring to FIGS. 7 and 8, a GUI 700 is initially loaded, via the loaded document list generator 260, in the document list window 710 with a listing of documents of interest for applying text analytics rules by the user (step 600). The documents can be obtained from one or more different sources to develop a document corpus (i.e., a set of documents that are to be subjected to text analytics rules for searching purposes) of interest. As previously noted, these documents have already been tokenized to define rules for words or phrases within each document of the corpus in the manner described above. In the example embodiment depicted in FIG. 8, five documents have been loaded in the document list window 710 for rule analysis utilizing the GUI 700. A user selects a document of interest from the window (e.g., by double clicking on the selected file), and the document editor 265 opens an editable text version of the document in the document edit window 720 (step 610). A document ('Patient1.txt') is opened in window 720 as shown in FIG. 9. Opening of the document in the document edit window 720 also results in an editable token parse tree being displayed in the token parse tree window 730 by the token parse tree creator component 270 (step 620). As previously noted, in an example embodiment, the token parse tree creator component 270 converts the XML created by the XML creator component 235 into the parse tree format, where each token is associated with a text component, such as a word or phrase, within the document and can be expanded to show more details of the token (or collapsed, if in an expanded format) in the form of token components or additional nodes.

Figure 10:
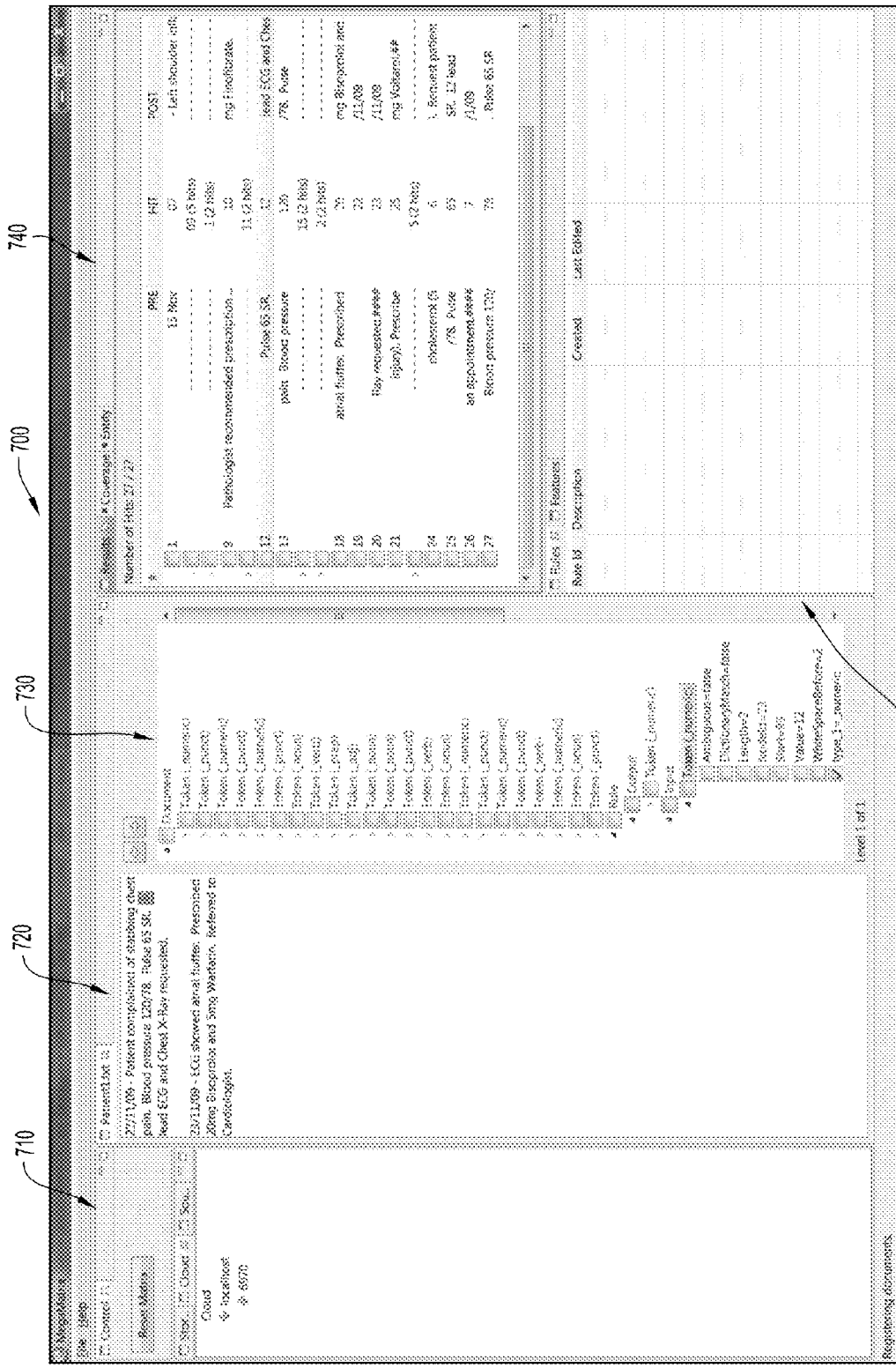

The token parse tree displayed in window 730 includes click boxes that can be selected by a user (e.g., utilizing a mouse pointer, where a selected box is highlighted or includes a check mark within the box) to construct a text analytics rule for potential application to the document corpus. As shown in FIG. 10, a particular word or other text component can be highlighted within the document edit window 720 (e.g., numeric text "12"), and this results in the token parse tree opening or expanding the token that corresponds with such text component in the document (e.g., Token (_numeric) as shown in FIG. 10), where the opening of the token reveals further token components or nodes with corresponding check boxes providing information about the token (e.g., the capitalization of the text, the text length, the node identification for the text, the start location of this text within the document, the classification type for the text (e.g., alpha, numeric, etc.), etc.) to facilitate initiation of rule construction at the appropriate token corresponding with the selected text component. A single click on a checkbox node of a token in the parse tree automatically triggers the construction of a rule (shown as Input-Output nodes within the token parse tree of window 730) to be applied to the document corpus to determine how the rule impacts the document corpus (step 640). As shown in FIG. 10, the user has selected the "type_1=_numeric" check box, and this triggers the application of an existing numeric rule to be implemented for the document corpus. The results view generator component 275 searches the document corpus for documents including text components that are associated with tokens that comply with, conform to or match the rule (e.g., each document having a numeric type token) and generates a list of matching documents or "hits" including the matching text components that are displayed in a results view window 740 of the GUI 700. As can be seen in FIG. 10, 27 matching documents or hits from the document corpus are displayed in the results view window 740, where each matching document lists the identified text component that matches or complies with the rule as well as preceding and post text in relation to the matching text.

The user can select at this point whether to amend or revise the rule based upon the token parse tree for the current document displayed in the document edit window 720 (step 660), by checking click boxes for the same or other tokens or combining tokens to generate, validate and apply new rules for phrases (as described below). Alternatively, the user can select another document within the results view window 740 (step 670) that may be of interest to the user (e.g., for application of a new rule). For example, in the results view window 740 of FIG. 10, there are multiple different phrases associated with numeric tokens of the documents, such as dates, pulse or blood pressure values, etc. It may be desirable to explore the application of certain text analytic rules to these different types of phrases in other documents and see how those rules affect the document corpus.

In the event the user decides to select a new document for viewing by the GUI 700, the user simply selects the document (e.g., by double clicking on the hit associated with the document from the results view window 740), which results in the opening of a second document including a second copy of the applied rule, in which the text of the selected document is displayed in the document edit window 720 of the second document, the token parse tree for the selected document is displayed in the token parse tree window 730 of the second document, and the same set or list of document hits is displayed in the results view window 740 of the second document (since the same rule is current being applied to the document corpus).

Figure 11:
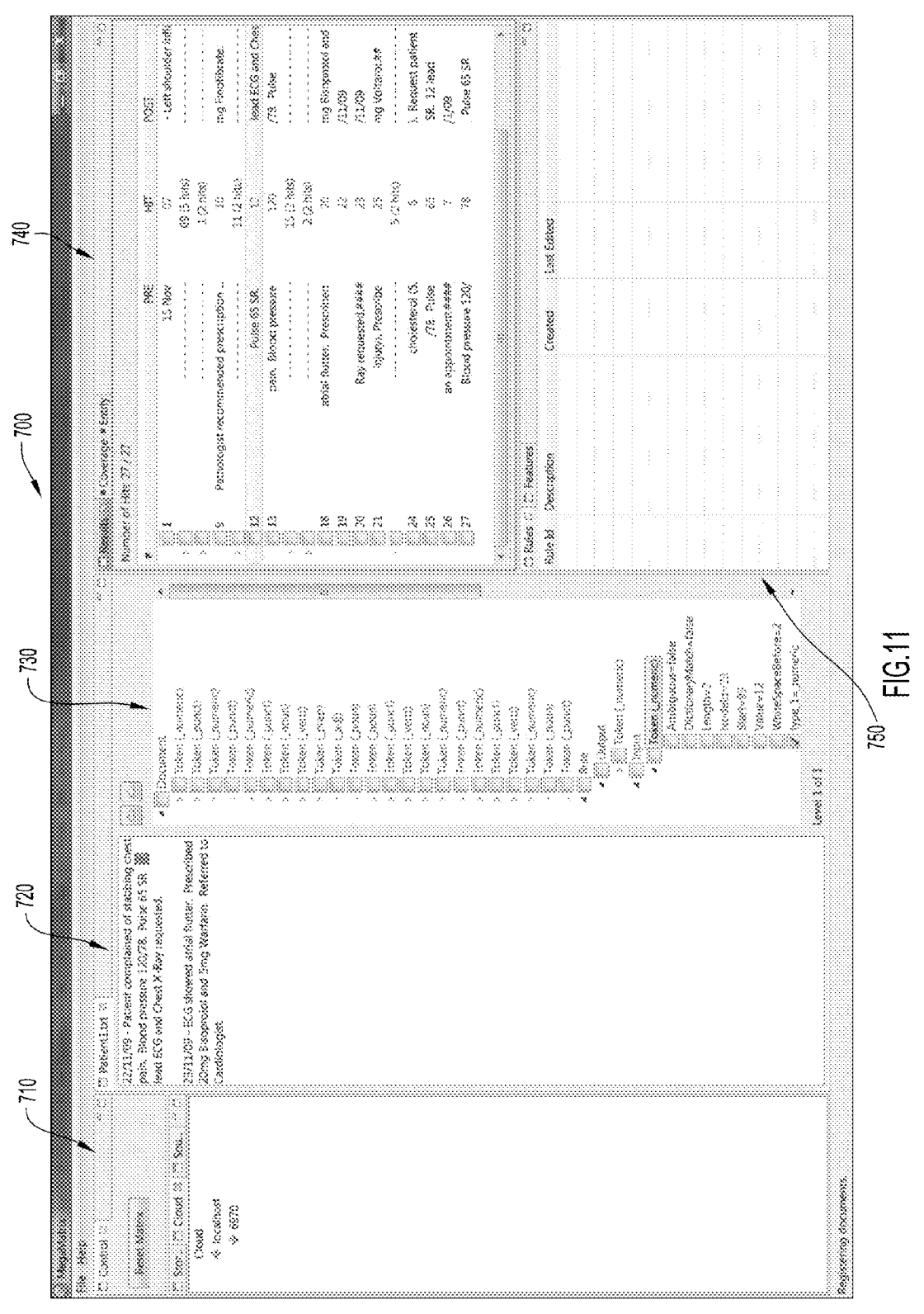
Figure 12:
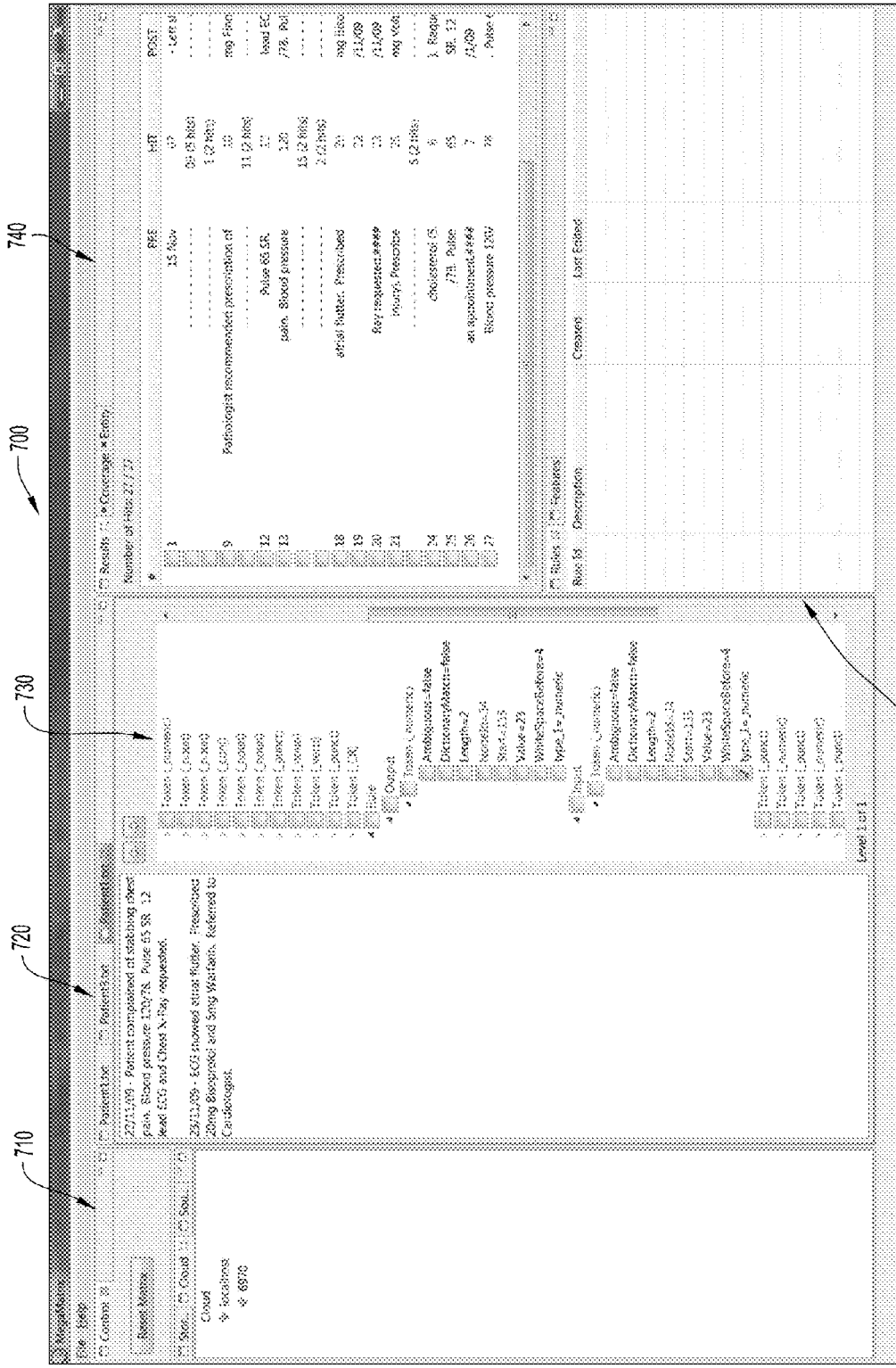
Figure 12:

The user may be interested, for example, in the phrase "25 mg" (which is one of the hits from the results view window 740). The user can simply click (or double click) upon that hit, which results in the opening of this document ('Patient3.txt') in the GUI 700 as shown in FIG. 11. As can be seen in FIG. 11, the document edit window 720, the token parse tree window 730 and the results view window 740 of the GUI 700 all display information associated with this document, including the same numeric rule that was applied for the previous document ('Patient1.txt') in and also the same hits obtained from the document corpus. The user may further be interested in a hit associated with a date. By double clicking on the date (or any of the numbers associated with the date), the GUI opens the document ('Patient1.txt' is again opened) with the relevant information in the windows 720, 730 and 740 for this document as shown in FIG. 12. In the GUI 700 of FIG. 12, there are now three separate rules for the three open documents being edited each with an associated hit list. While all three rules are the same (since the second two documents opened just copied the original rule), the user can move or toggle between each of these documents within the GUI 700 (e.g., by selecting the appropriate button for 'Patient1.txt', 'Patient3.txt' or 'Patient1.txt' at an upper location of window 720) to edit the rules and apply the edited rules to the document corpus.

Figure 13:
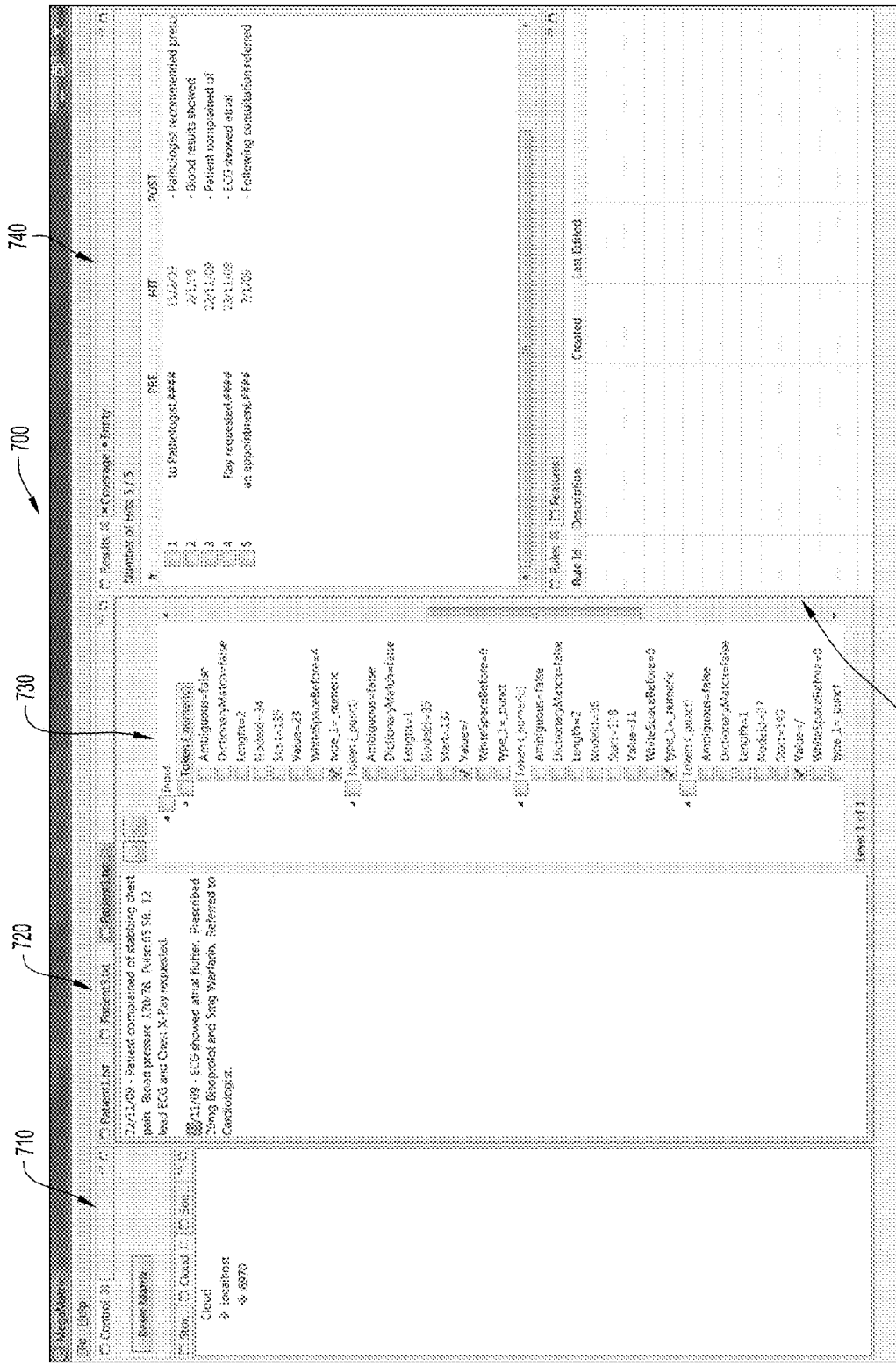
Figure 14:
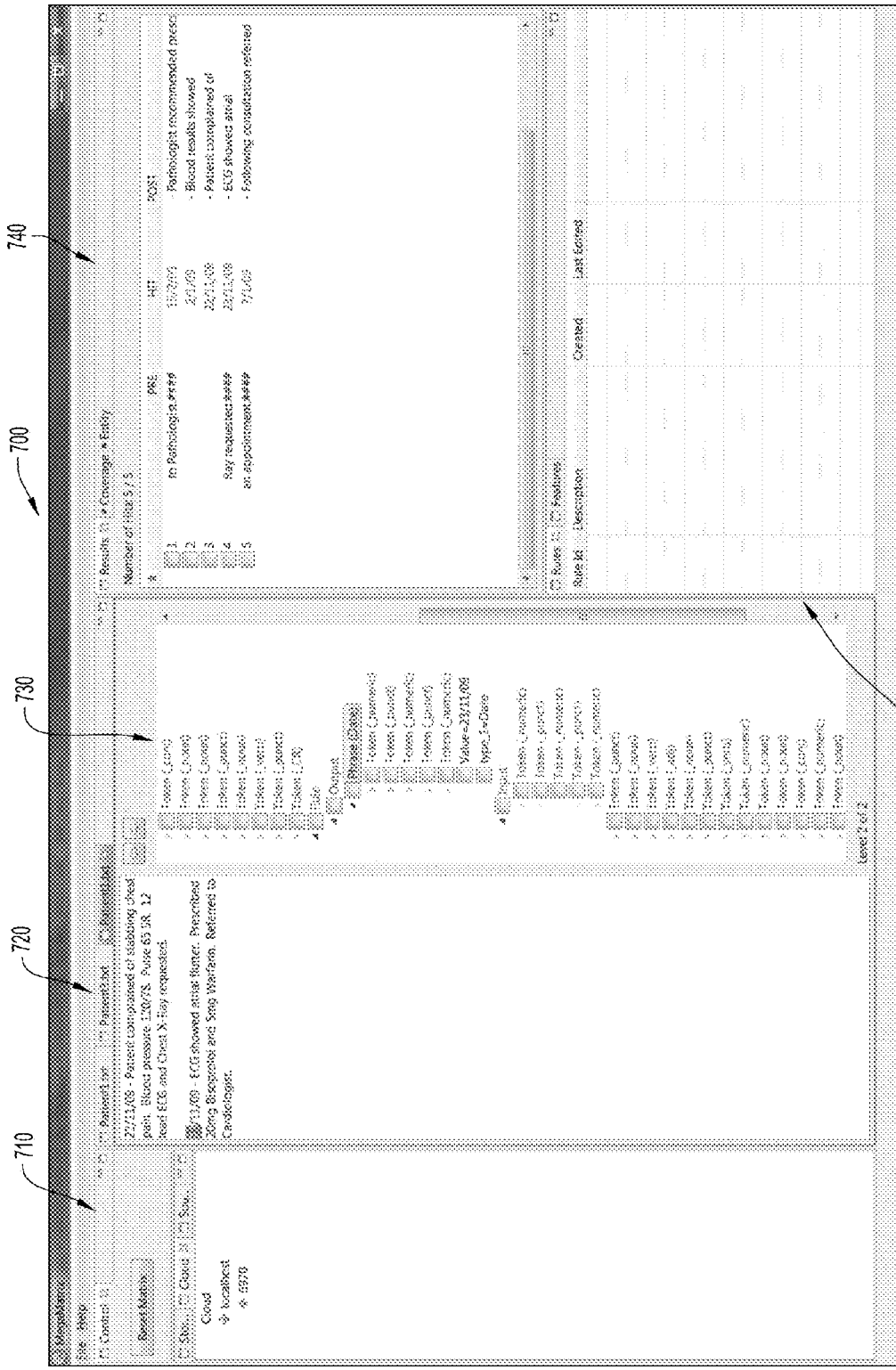

Referring to FIG. 13, the user chooses to modify or amend one or more existing rules (step 660) by specializing the rule for the document 'Patient1.txt', in which neighboring text components are combined (where token rule boxes are selected for numeric type value '23', punctuation type value '/', numeric type value '11', punctuation type value '/' and numeric type '09') so as to establish a date rule of numeric, punctuation type value "/", numeric, punctuation type value '/', numeric (i.e., all hits must contain the consecutive sequence of number, "/", number, "/", number). As can be seen in the results view window 740 of the GUI 700 for FIG. 13, this modified rule reduces the results to 5 hits for the selected document corpus (as displayed in the document list window 710). The user can view the results to make sure that the hits in window 740 accurately reflect how the user intends for the rule to be applied within the token parse tree window 730. It is noted that, at this point, the modified rule has not yet been applied as a rule to the document corpus, it simply provides an indication (based upon the hits obtained within the results view window 740) of how such a modified rule would be implemented to find documents within the corpus.

Figure 15:
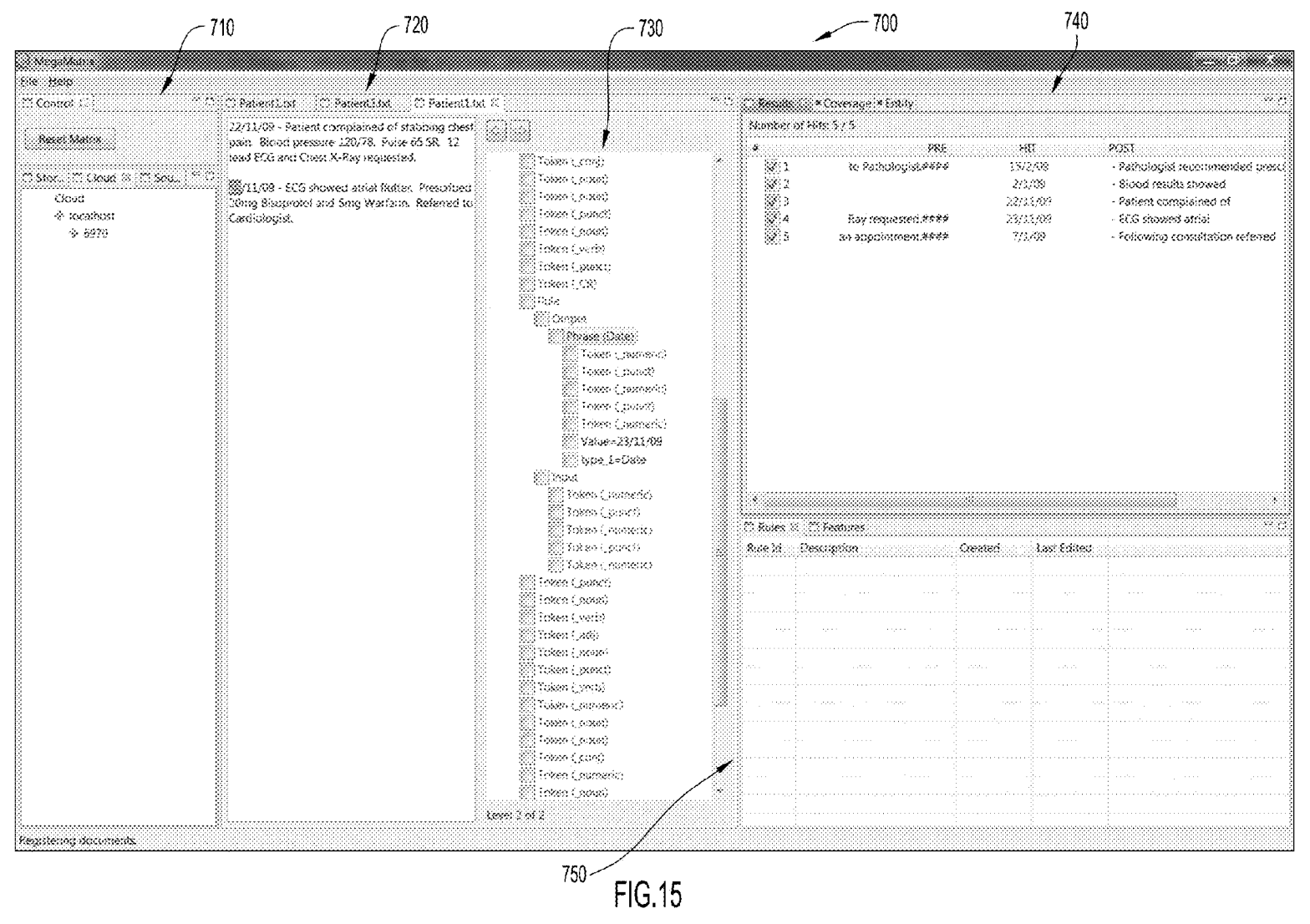
Figure 16:
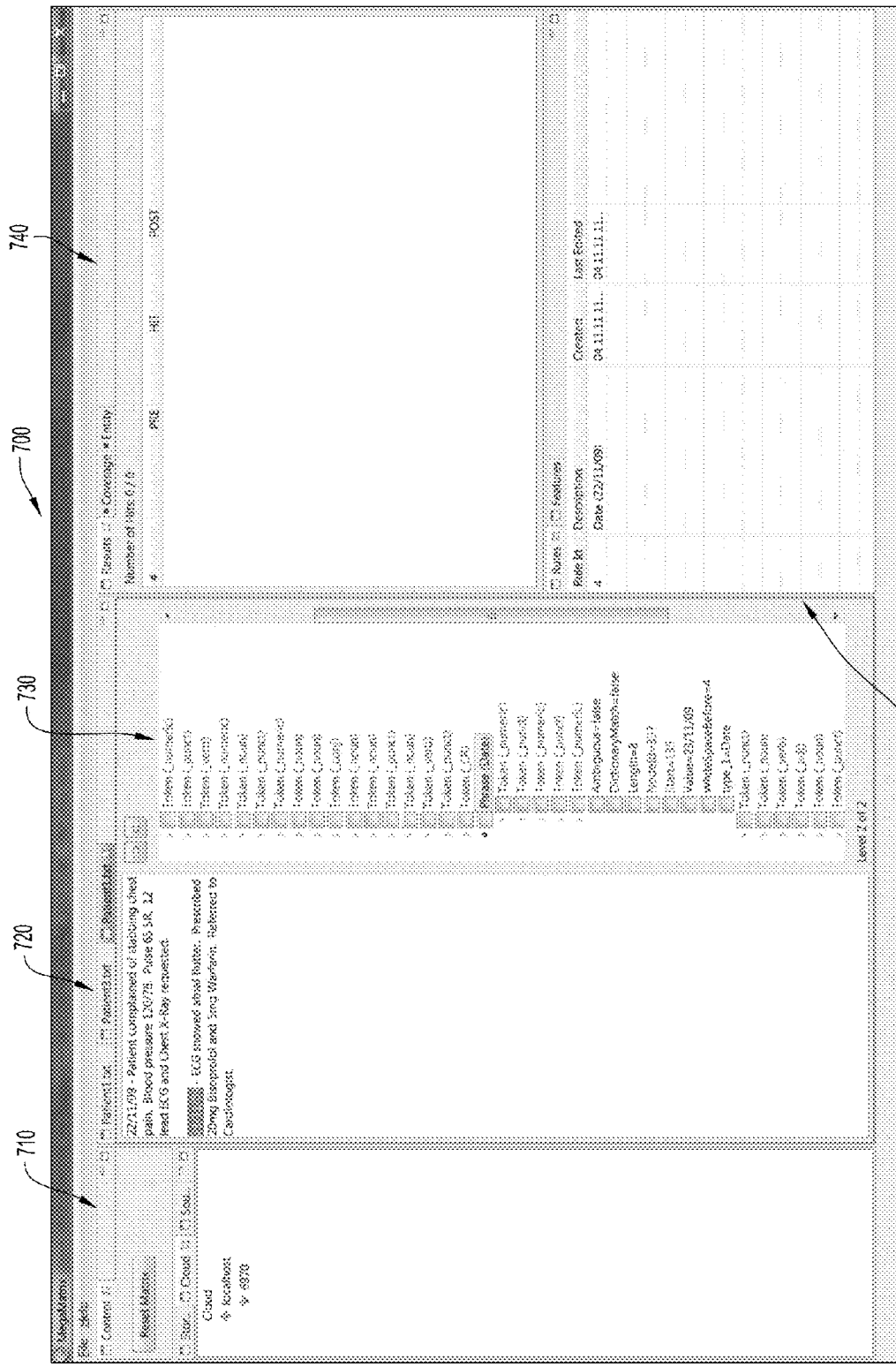

The user can continue to generate a specialized rule by combining the consecutive tokens for text components to create a new token comprising a single rule phrase and defining the phrase as 'Date'. As shown in the GUI 700 of FIG. 14, the text components for document 'Patient1.txt' are combined in an output node of the token parse tree depicted in window 730 as a rule phrase in which Value="23/11/09" and is defined as 'type_1=Date". As shown in FIG. 15, this modified or specialized rule can be validated by the user checking the boxes for the hits displayed in the results view window 740. The validated rule can then be applied to the document corpus, via the components 210-250 of application 200, by making an appropriate selection for applying the rule within the GUI 700 (e.g., the user obtains a pop-up window within the GUI 700 by right clicking the mouse, followed by selecting an "Apply Rule" option within the pop-up window). After the rule has been applied, as shown in FIG. 16, the token parse tree within window 730 is updated to show the new rule (the "Date" annotation), and the hits are cleared from window 740 to further indicate that the rule has now been applied to the document corpus. In addition, a specialized rule identifier window 750 shows the new rule including any other information associated with the rule (e.g., date created, date last modified, etc.). The user can select this rule (e.g., by clicking on the rule) to have it easily identified within the token parse tree in window 730.

Figure 17:
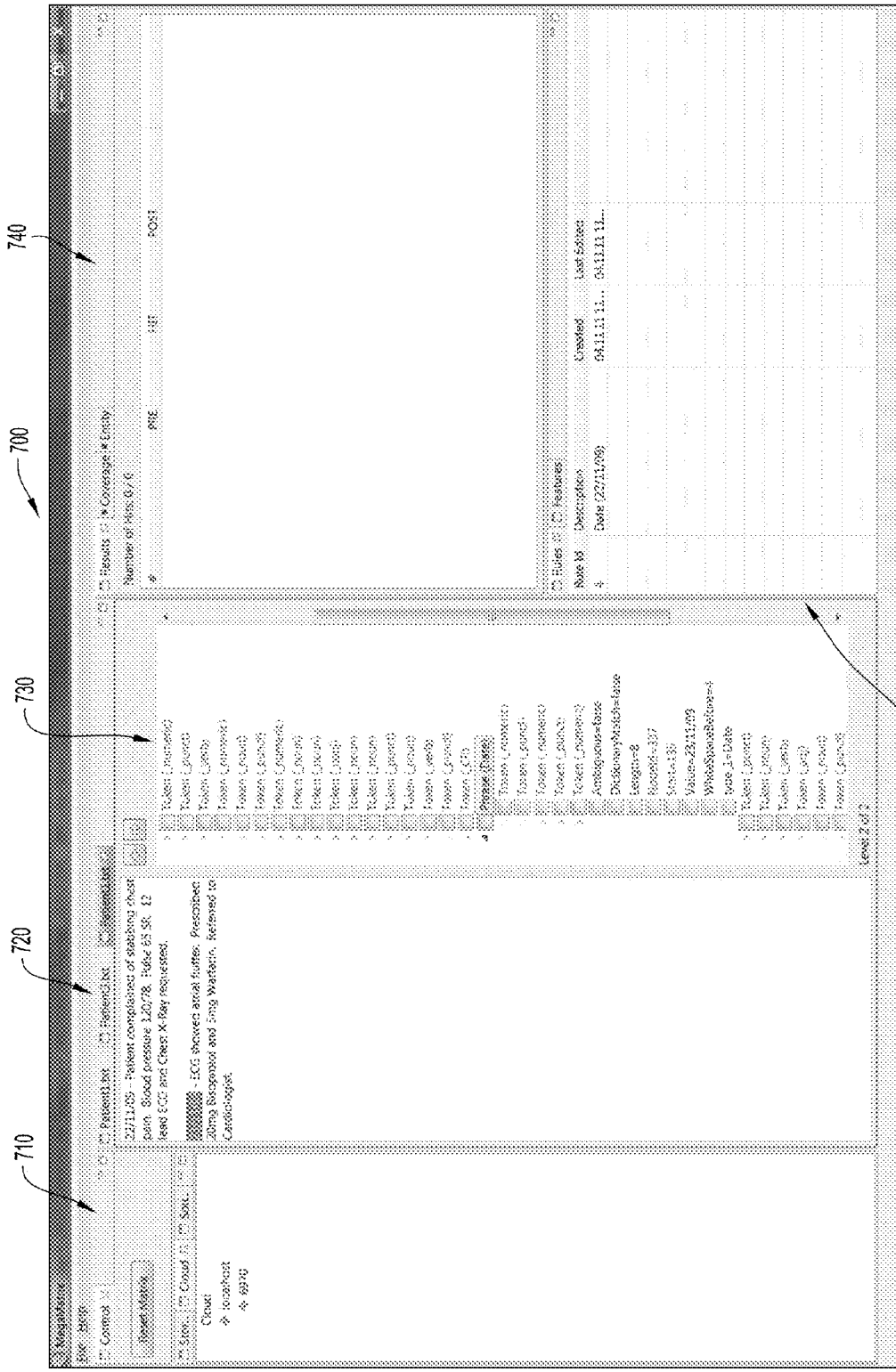

After application of this new ('Date') rule to the document corpus, the user can confirm it has been applied, e.g., by switching to the first open document 'Patient1.txt', as shown in FIG. 17. In particular, the results view window 740 now shows 12 hits, whereas the number of hits prior to application of this 'Date' rule was 27 (as shown in FIG. 10). The fewer hits results from the fact that the numeric tokens that were previously included with the application of the original rule for the two documents are now absorbed within the 'Date' phrase of the rule parse tree, such that selecting the numeric token will not cause the rule to fire for the numeric text components in the phrase that is now defined by 'Date'. Thus, any open documents with associated hit lists will be updated in correspondence with any validated and applied rule (e.g., the applied 'Date' rule removes any date phrase fro the hit lists for the other open document files within the GUI 700).

Figure 18:
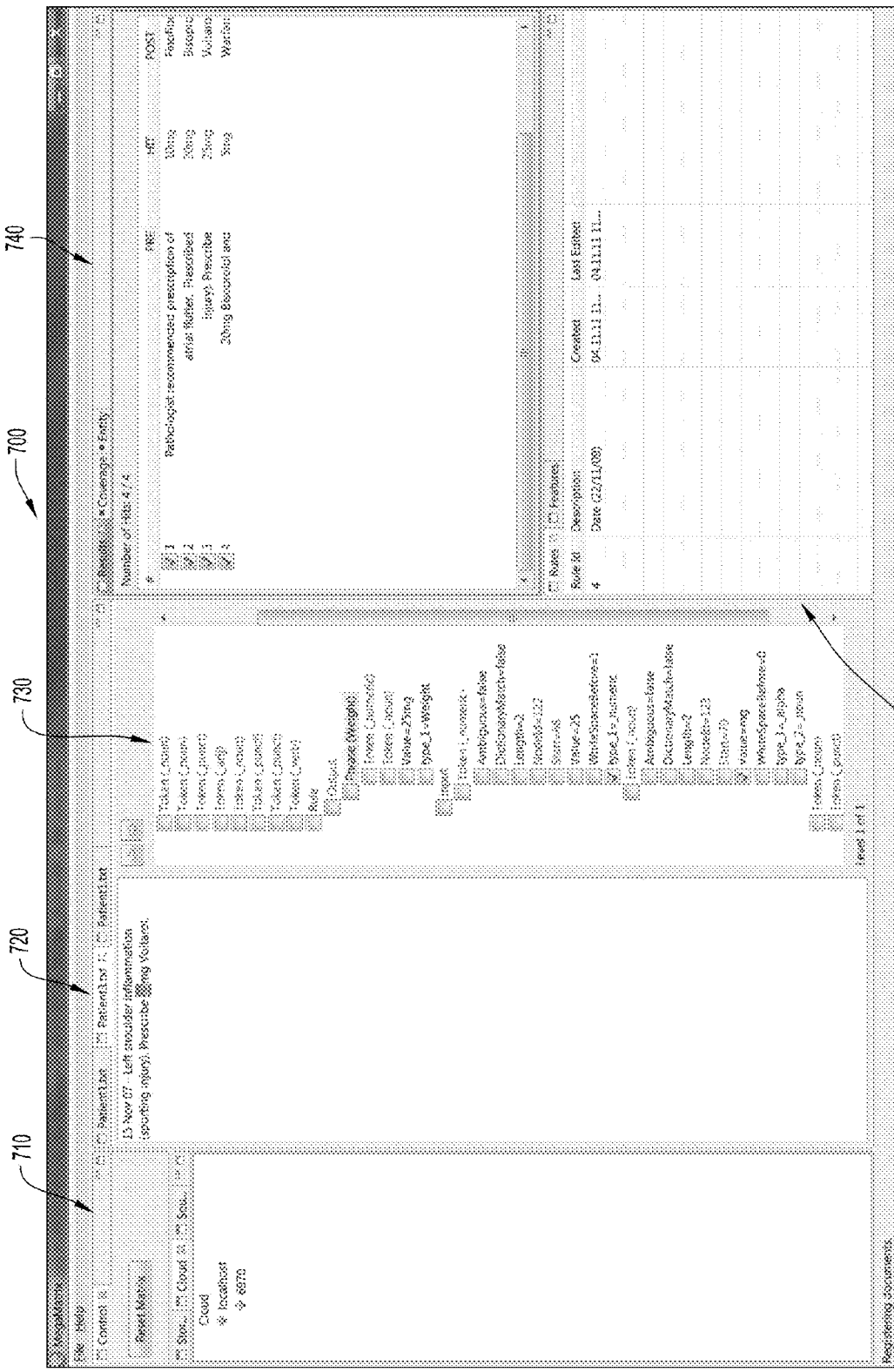
Figure 19:
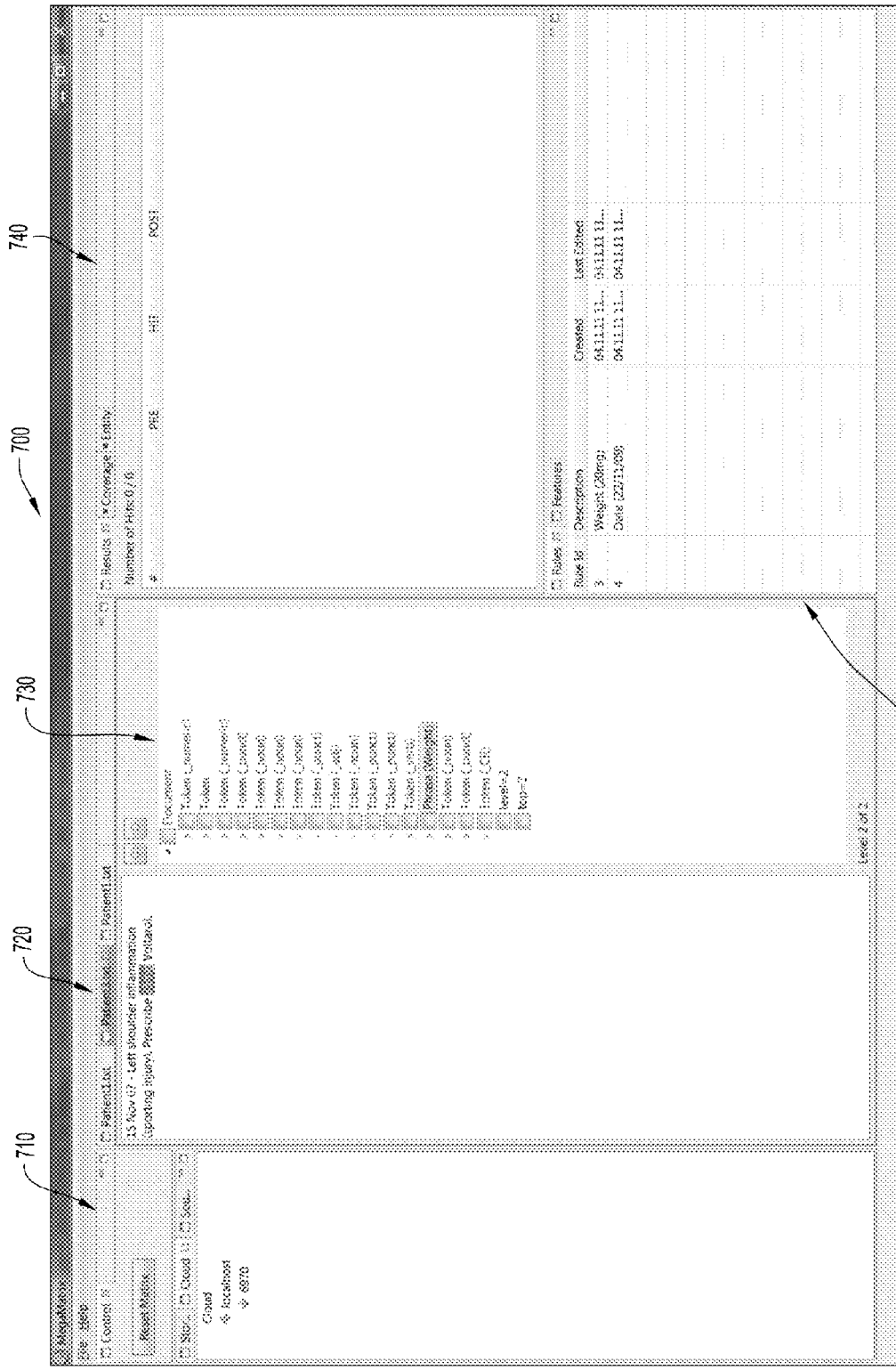
Figure 20:
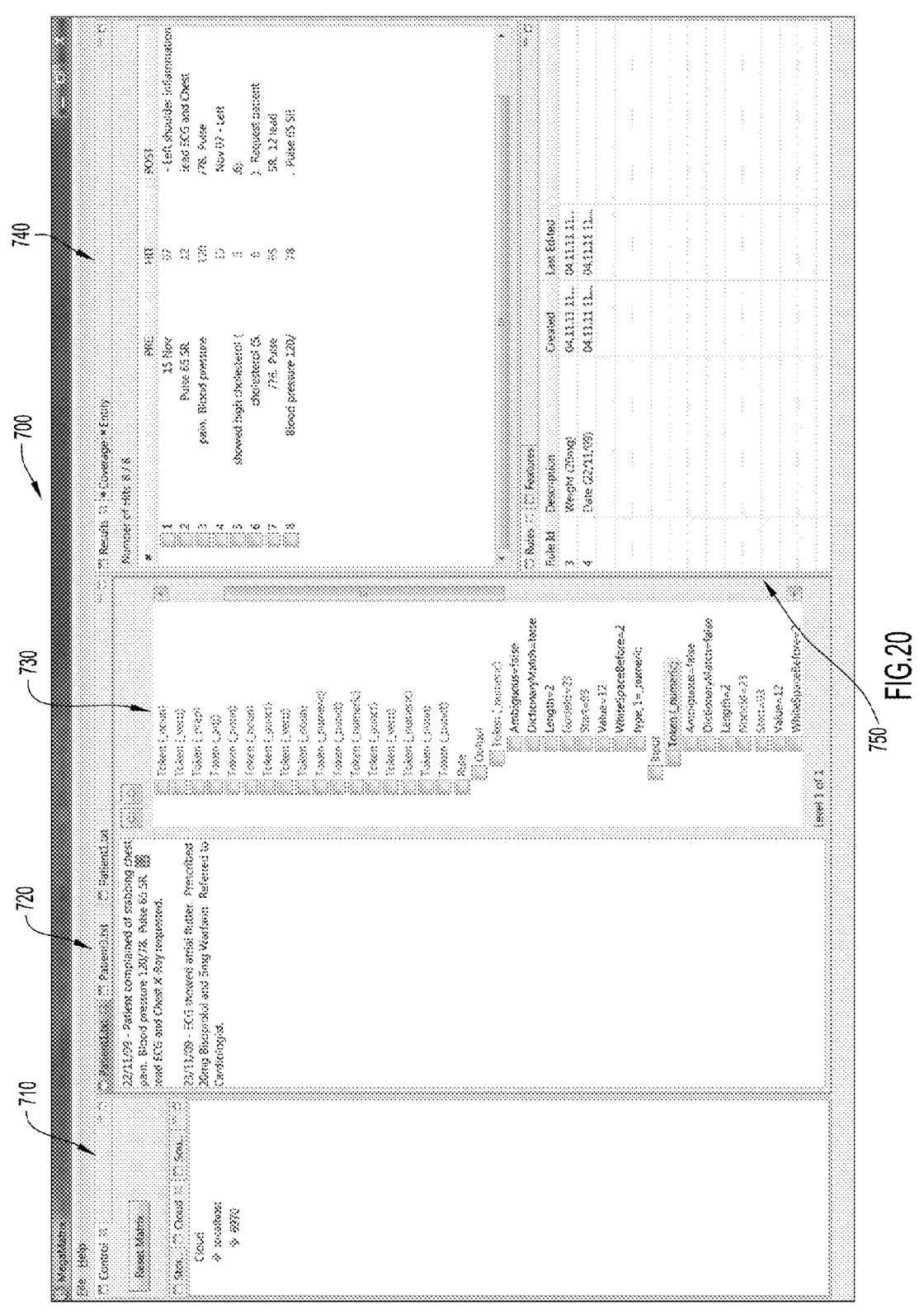

As shown in FIG. 18, the user can further switch to any of the other opened documents to form another specialized phrase rule by creating a new token. In the example shown in FIG. 18, the document 'Patient3.txt' is selected, and a specialized phrase rule is generated by creating a new token named 'Weight', where the phrase rule is created in the same manner as noted above for the 'Date' phrase rule. In particular, the consecutive text components having a numeric value followed immediately by the token value 'mg' (e.g., the text '25 mg' of document 'Patient3.txt') are indicated under the phrase rule of the token parse tree displayed within window 730. This created rule can be validated and applied in the same manner as noted above for the 'Date' phrase rule. As shown in FIG. 19, the 'Weight' phrase rule is shown along with the "Date" phrase rule in the rule identifier window 750 of the GUI 700. As shown in FIG. 20, application of the 'Weight' phrase rule to the document corpus further reduces the number of hits that are displayed within the document 'Patient1.txt' (since the numeric token for the text components that are now linked with the value 'mg' for the new 'Weight' phrase rule are now removed from the numeric rule).

Thus, the GUI 700 provides a number of useful features, including the combination of a document editor, which displays a selected document, with an editable rule parse tree in a single interface. In other rule development tools, a user would have to switch between different windows in order to view rules for particular documents and apply and test rules to a document corpus. The functionality of providing a single selection (e.g., one click functionality) achieves the same tasks that would otherwise require multiple selections (e.g., 10-20 clicks or more) in other tooling environments. The features provided by the GUI further allows a user to select (e.g., by double clicking) on a hit within the hit list displayed within the results view window 740 and automatically open an editable version of the associated document within the document edit window 720. The GUI 700 further facilitates the automatic construction of a rule, as well as revising or specializing the rule, and an automatic population of a hit list showing how that rule is applied to the document corpus. The GUI 700 further allows the user to switch between documents and see the hit list associated with each document. In addition, the GUI 700 facilitates the automatic updating of all hit lists, across all documents, when a rule is applied. These GUI features have a significant impact on rule quality as they enable the simultaneous development of multiple rules. This enables a user/developer to identify and remove conflicts.

The embodiments of the present invention further provide a useful hit list (e.g., within the results view window 740 of a GUI 700 as described above) by managing the number and types of hits that result from application of a particular rule or combination of rules (e.g., by utilizing the editable token parse tree provided within window 730 of GUI 700).

When dealing with numerous documents (e.g., hundreds of thousands or millions of documents) from a document corpus, a very general rule applied to the document corpus can generate massive numbers of hits. Large hit list management functionality can be achieved to reduce the number of individual hits by identifying duplicates and returning a hit list in which only unique hits are listed, utilizing insertion sorts (e.g., on the server side providing documents for the document corpus) and merge sorts (e.g., on the client side that receives documents from multiple servers) to provide the hits in alphabetical order (where the sorting algorithms can be applied to the actual text of a phrase, to preceding or post text for the phrase for hits triggered by a phrase rule), and batching of the hits to ensure that the total number of hits returned from an applied rule does not consume all of the memory of the requesting device.

Figure 26:
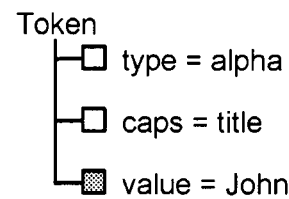
FIGS. 26-29 show example text analytics rules comprising a number of text components, identified as tokens by a token parse tree.

As noted above, a text analytics rule to be applied to a document corpus can comprise a number of text components, identified as tokens by the token parse tree. Consider an example scenario with the token shown in FIG. 26.

In this scenario, the value box is selected for the token (it is shaded), and this is the only feature used to determine whether the rule will fire. Thus, this rule will fire regardless of the capitalization (e.g., the rule will fire for John, JOHN, and john). The other boxes represent the type of phrase (e.g. alpha, numeric, punctuation, alpha-numeric, etc), and capitalization type for the phrase (e.g. lower case, upper case, title case).

Figure 27:
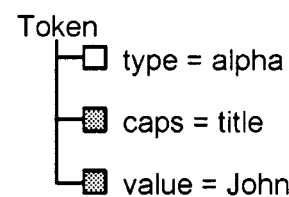

A more complex rule can be defined that only fires for title case occurrences of the phrase John, as shown in FIG. 27.

Figure 28:
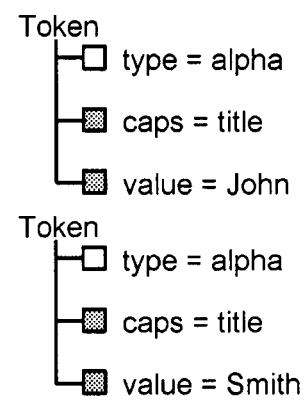

In addition, as previously noted, rules can be modified and specialized, e.g., by combining two or more tokens to form a specialized phrase. For example, the rule shown in FIG. 28 fires for the phrase John Smith where both John and Smith are title case.

In the generation and maintenance of a hit list, a typical approach might be to create an initial hit list when the first rule is created and then specialize or generalize the hit list when further rule components/rule tokens are either added to or removed from the original rule. Unfortunately, this approach does not work as rule conflict may prevent a rule from firing for valid cases.

Figure 22:
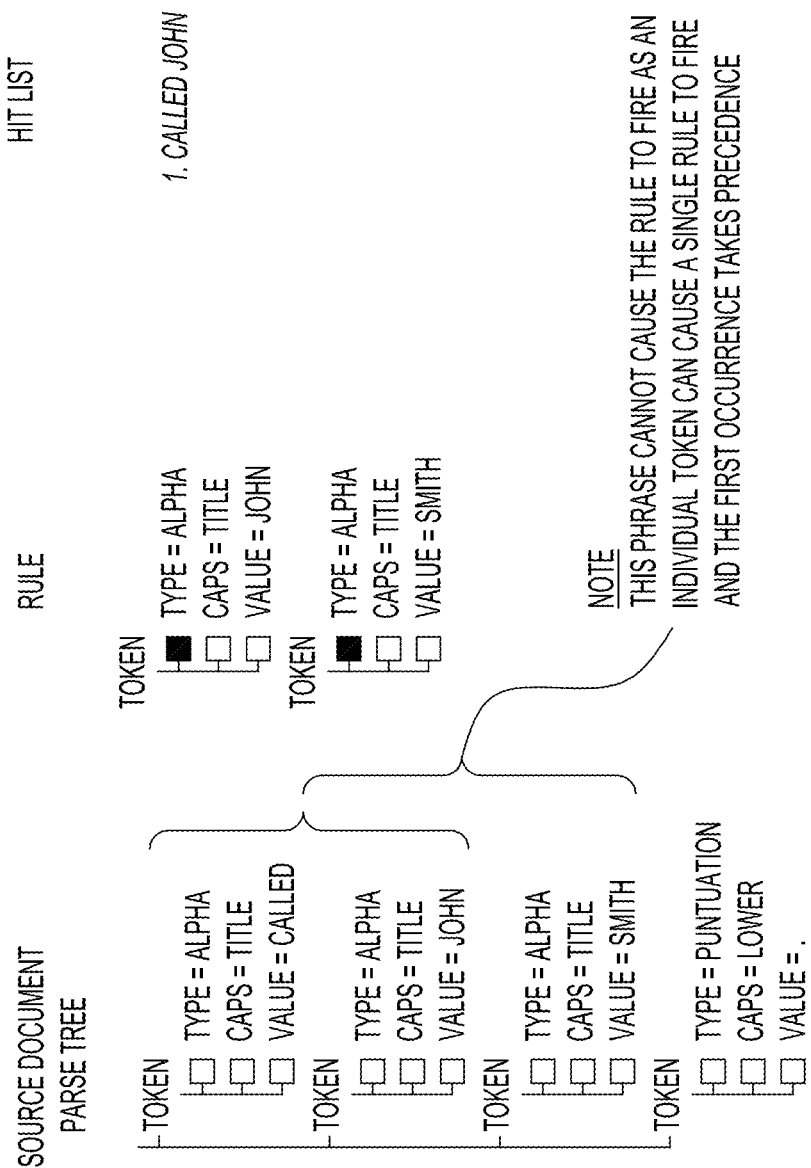
FIG. 22 depicts a token parse tree diagram for a scenario where a rule for two consecutive tokens causes a hit list to be generated.
Figure 29:
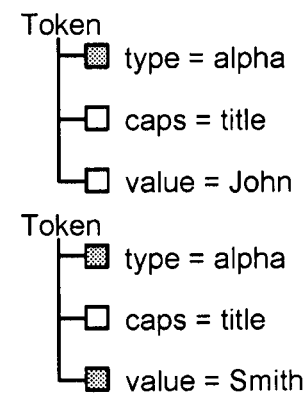

The token parse tree diagram depicted in FIG. 22 illustrates a scenario where a rule for two consecutive tokens of type alpha causes a hit list to be generated for the text components 'called John Smith.' As can be seen in FIG. 22, the hit list would generate the hit 'called John' (since this is the first occurrence of two tokens of type alpha within the phrase 'called John Smith.'). If the user then specializes the rule as shown in FIG. 29, the only hit in the hit list will no longer cause the rule to fire and will be removed (since the hit does not have 'Smith' in it). This would result in an empty hit list despite the fact that a valid hit exists in the source text.

This potential problem is resolved, in accordance with embodiments of the present invention, by re-generating a hit list whenever the rule is revised by adding, modifying, replacing and/or deleting tokens or combinations of tokens within the rule. To ensure that the new rule covers all valid hits and can be tested within an acceptable timeframe, the following algorithm for testing rule components can be applied:

1. Conduct iterations through the rule components (e.g., selected tokens within the rule) and determine from the text index which rule component has the lowest number of hits.
2. Select the component with the lowest number of hits as the first component to be tested, and generating an initial hit list based upon this first component.
3. Finding the next component to be tested by spidering across connected rule components (e.g. parents, children and siblings) of the token parse tree to determine which of these components has the lowest number of hits.
4. Testing every hit in the hit list to determine whether it is valid with the rule. If it is not valid, the hit is removed from the hit list.
5. Repeating steps 3 and 4 until all rule components have been tested.

In addition to the rule component testing, precedence testing can be applied to provide an understanding of whether the rule can actually fire for each hit. A rule cannot fire if another rule with a higher precedence is already firing for one or more of the features covered by the new rule. Precedence can determined in order by: rule complexity (i.e. the total number of features tested by the rule), position in the document (i.e. if two rules overlap, then the rule which covers the earlier phrases in the document takes precedence), and rule creation time (i.e. an earlier rule takes precedence over a later rule).

As previously noted, the number of hits that might be obtained for a large document corpus, and depending upon the text analytics rule being applied to that corpus, can be significantly large. In example embodiments of the present invention, an initial hit list from application of a rule to a document corpus is returned as small as possible within the GUI 700. For example, each node in a supporting server grid from which the document corpus is derived can be assigned a specified batch size with the aim of returning collectively enough hits to fill the results view window 740 of the GUI 700 a specified number of times (e.g., 2×, 3× or 4×, etc.), where the number of hits for each time corresponds with how many hits can be displayed within the window 740 without scrolling. The window 740 includes a scrolling feature (e.g., see window 740 of the GUI 700 for FIGS. 10 and 11, in which a scroll bar is provided to view more hits). If the User moves the scroll bar, further hits can be requested (e.g., from one or more servers providing the documents associated with the hits). This feature ensures that all hits are visible to a user without the network performance becoming a bottle neck for very large hit lists.

As previously noted, the rule application process results in a hit list that may contain 10,000+ hits, 100,000+ hits, or even more hits. Each hit is detailed in a structure that holds meta data about the hit (including, e.g., the document id, the start and end offsets of the hit within the document, etc.). The hit lists can be sorted using any suitable sorting algorithm, particularly an algorithm that sorts hit IDs within an index (where the hit IDs represent hit lists) so as to avoid moving entire hit list structures. When multiple servers are used to derive the document corpus, each server can provide a hit list to a requesting client based upon application of a text analytics rule. An insertion sort or a merge sort can be used to ensure that hits from multiple servers are presented in a sorted order. The insertion sort algorithm can be extended to include calls for additional hits from a server in cases where relative hit lists are not aligned. In addition, sorting and removal of duplicate hits can be achieved by analyzing the text content on either side of the text associated with a hit for a particular rule.

Thus, multiple hit lists can be constructed that are each associated with a specific rule. For example, each opened document in the GUI 700 embodiments above contains its own hit list. Since the applied rule was the same initially for each open document, the hit lists were the same. However, when changes were made to the rule for a particular open document, the hit list automatically changed for that open document. Validation of the hits and application of the rule to the document corpus also can result in a change to the hit lists of other open documents, as shown in the previous embodiments (since the applied rule can result in certain hits, such as 'Date' phrases of the previous embodiments, being absorbed by the applied rule so as to not fire as a hit for the other hit lists).

In an example embodiment, when a new rule is created, a rule ID is created and associated with the rule. The rule ID can be stored by the requester/client. The hit lists can be constructed by the server(s) (i.e., where the documents from the document corpus are located) and associated with the unique rule IDs. In addition, indexed entries of text components from the token parse trees of documents can be associated with hit list entries, where each index entry includes a reference to a hit list ID and a hit ID (i.e., an ID for a hit within a hit list). If any index entry from a token parse tree is updated, for example when a rule is applied, it is possible to identify the hit lists and hit IDs that may be impacted.

For example, for an individual phrase such as 'John' there may be multiple index entries within the token parse tree of a document. In addition to the actual phrase index, there will indices covering the type (e.g. _alpha, Name, Person, etc), the capitalization, the length and the ending (e.g. for phrases that end in ial, ing, ed, etc). In addition, a phrase may exist in multiple hit lists at the same time. In this scenario, the indices relating to that phrase will all contain cross references to the multiple different hit lists and hits. If a rule is then applied that affects an index entry, the index is updated and the hit list cross references are used to remove the hit from all of the hit lists. The hit list structure can further contain reverse references to the indices so that, when a hit is removed (e.g., the user cancels the editing of a rule), the indices can be updated and any references to the hit removed.

Rule identifiers can also be associated with index entries so that the index items impacted by a rule change can be determined. In particular, each entity in an index can be associated with a list of rules that reference that index item in their input features. For example, if 5 rules contain a reference to the entity Name in their input features, the index entry for Name will contain a list of all 5 rules (by identifier). When a new Name entry is created in the index, the 5 rules will be automatically tested to see if the creation of a new Name entry causes any of the rules to fire.

The GUI features for the example embodiments of the present invention further provide a performance evaluation mechanism by which a user can understand and appreciate the impact of a rule change on its application to the document corpus.

Some conventional text analytics tools provide a mechanism where a set of rules can be applied in batch mode to a corpus of test documents for performance evaluation. This is invariably undertaken as a batch process that results in the generation of a static set of precision and recall statistics. In contrast, the example invention embodiments described herein provide real-time tracking of rule set performance. Referring again to the previous embodiments including the GUI 700 presented in FIGS. 8-20, in which a user first constructs and then modifies a rule, and then validates the rule such that it is applied across the entire document corpus (i.e., applying the rule to the hit list of all open documents), the GUI 700 provides a feature in which the performance metrics are shown for application of the rule for the entire corpus. The performance metrics are generated by a performance metrics generator component 280 of the GUI generator component 250.

Figure 21:
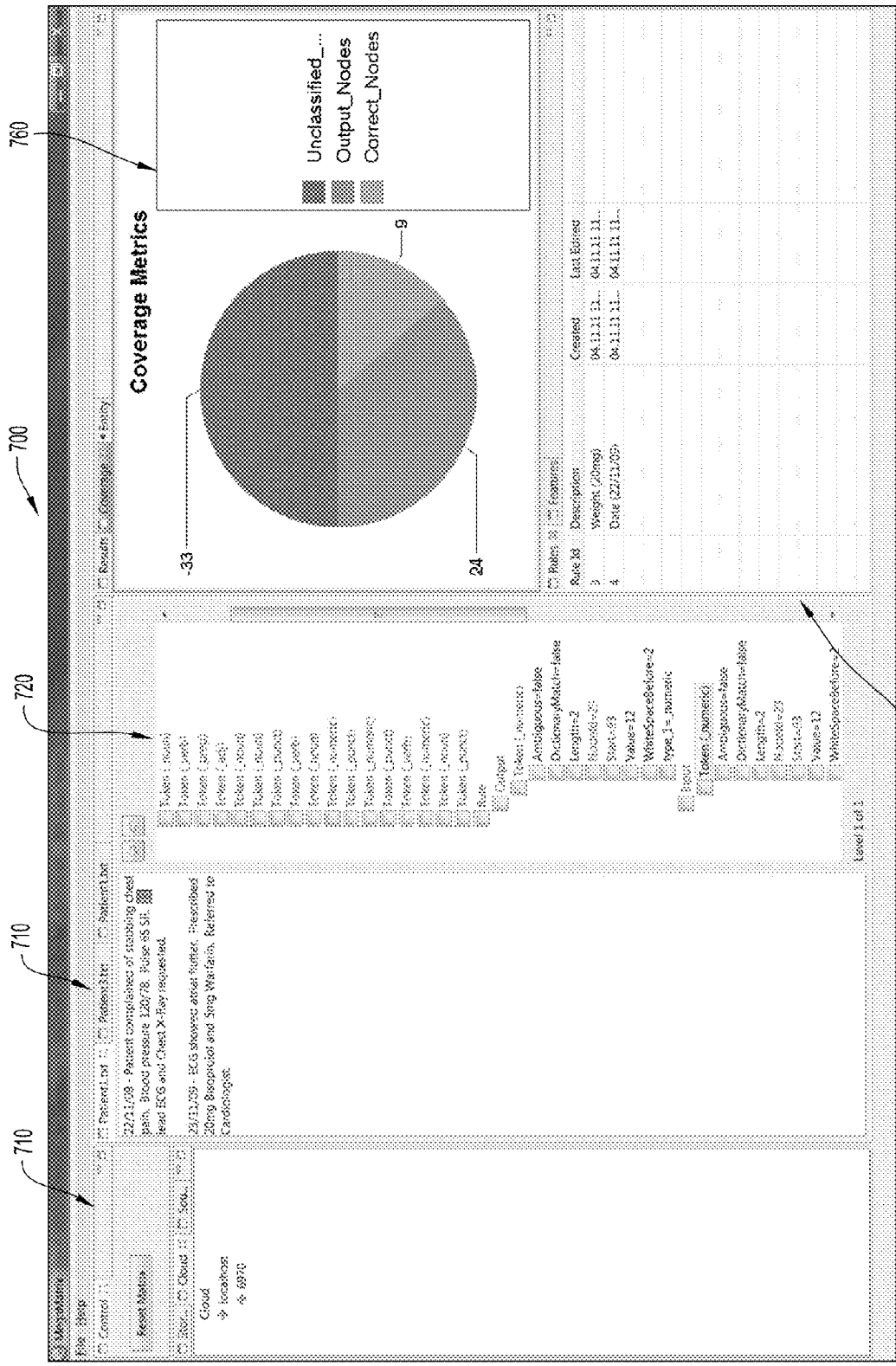

In particular, the user can make a selection to view the performance metrics after application of one or more rules, which results in the performance metrics generator component 280 generating a performance metrics window 760 for display within GUI 700 as shown in FIG. 21 (e.g., window 760 is overlayed upon the results view window 740). The performance metrics window 760 can provide any suitable type or types of information, including any suitable graphs or other information displays (such as the pie chart graph shown in FIG. 21 that provides an indication of the performance metrics of the applied rules. The graph depicted in window 760 of GUI 700 indicates that, for the two applied rules (i.e., the two rules listed in window 750), there are 33 tokens that are unclassified (not currently covered by any rules), 24 tokens covered by output rules and 9 tokens validated as correct. The performance metrics generator component 280 can further be configured such that, when the user selects any of the metric sections of the pie chart, a list of matching phrases can be shown immediately below the graph. This provides the user with the ability to easily drill down, identify the cause of errors and further optimize the rule set performance.

Figure 23:
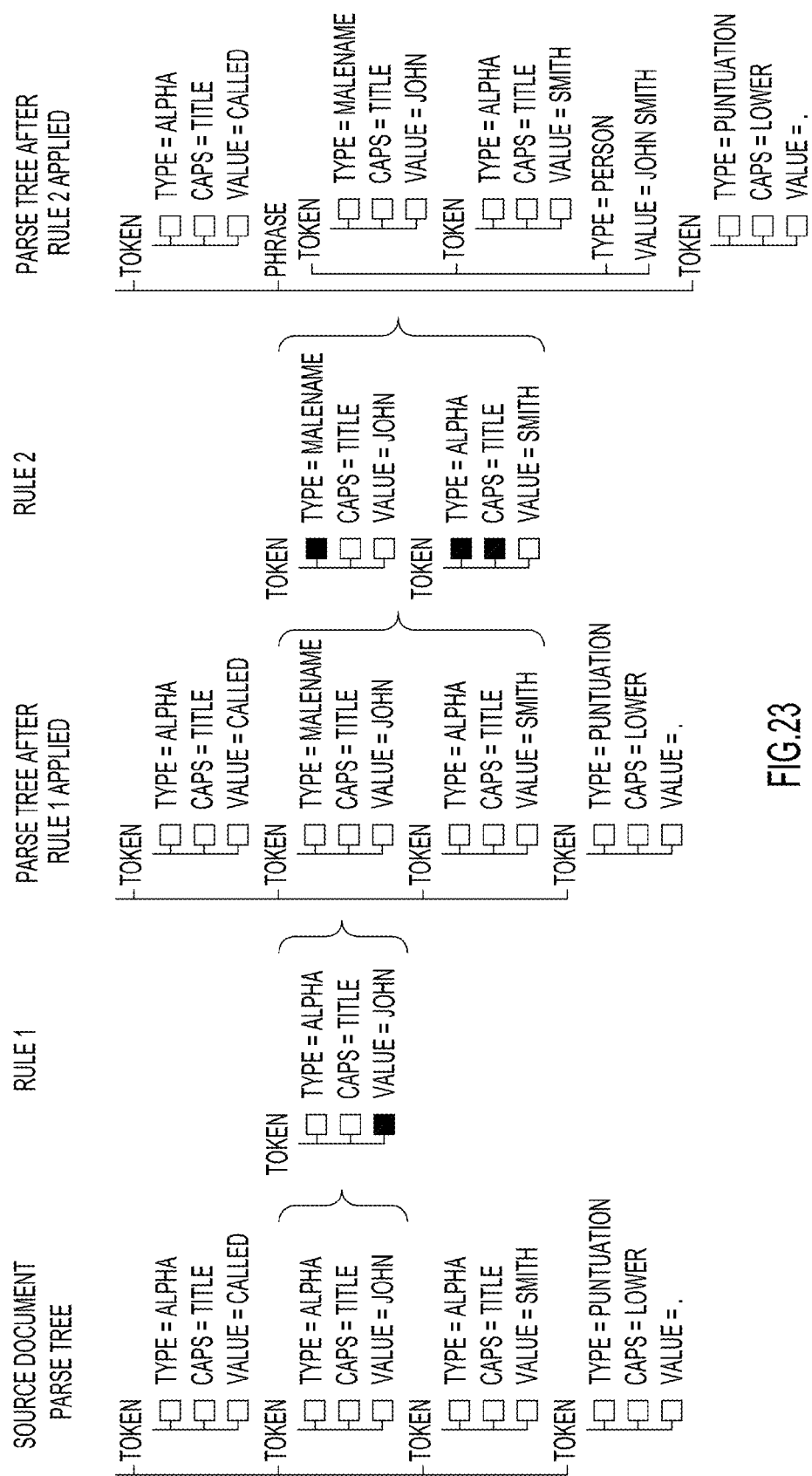
FIGS. 23-25 depict a linking of token parse trees during modification of a rule for a source document.
Figure 24:
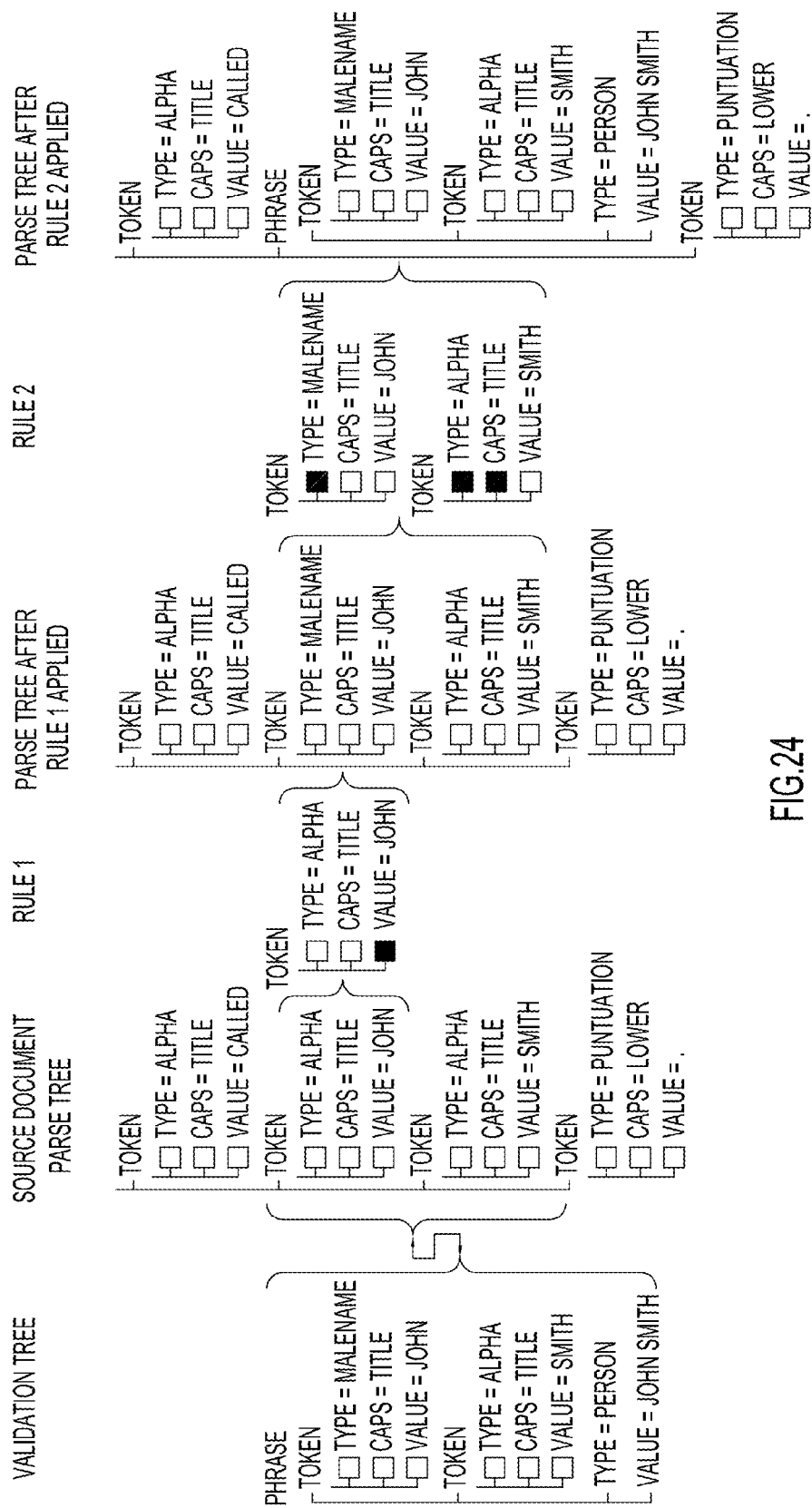
Figure 25:
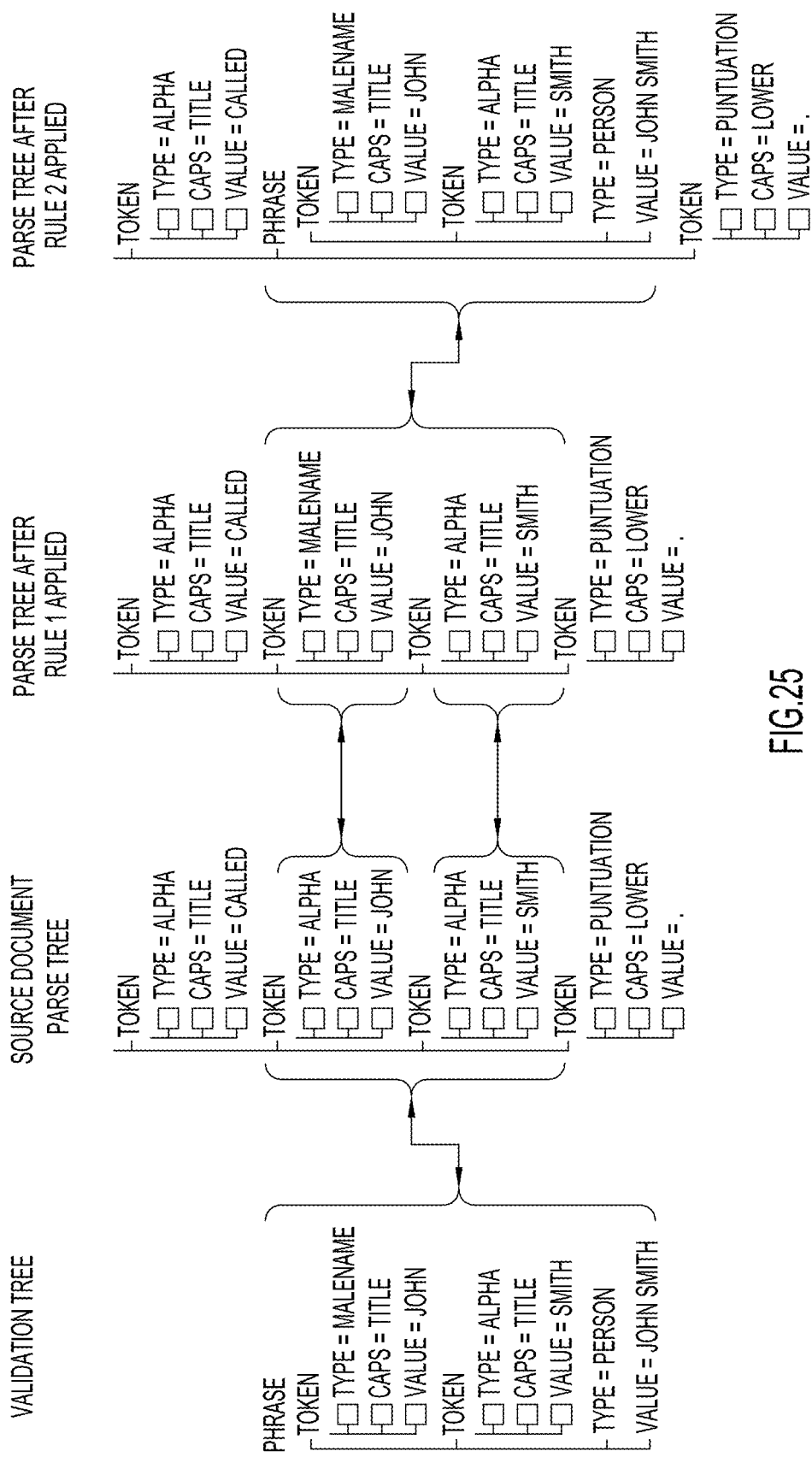

The evaluation performance of applying rules, including modification of rules (e.g., to develop phrases), adding new rules and/or deletion of a rule (e.g., to go back to a previous hit list), with automatic outputs of hit lists (e.g., shown in a results view window 740 of a GUI 700) in real time by the GUI can be accomplished in a number of different ways. In an example embodiment, validated annotation data structures can be generated by one or more components of the application 200, including components of the GUI generator component 250, that are linked to every token in the token parse tree for the documents of the document corpus. To understand how this can be achieved, consider the following example, in which rules are applied to a source document having a token parse tree as shown in FIGS. 23-25. In this example, Rule 1 identifies the phrase 'John' as a MaleName. Rule 1 further identifies phrases where the first term is of type MaleName followed by a second term of type alpha where the second term is title case. It groups these terms together a single Phrase of type Person.

When editing the token parse tree (e.g., within window 730 of GUI 700) with Rule 2, as shown in FIG. 23, the user validates the output of Rule 2 (e.g., in the manner described above for validation of rules within the GUI 700). Upon validation, a copy of the validated element of the tree structure is recorded (e.g., at the server side in a client/server scenario); in this example the copy would be the Phrase sub structure and is directly linked to the source input as shown in FIG. 24. Thus, the previous parse tree structures (i.e., original parse tree of source document, parse tree after Rule 1 is applied, and parse tree after Rule 2 is applied) are linked together for ease of reference. Each parse tree structure is a state or layer organized in hierarchical order in that Layer 2 (i.e., the parse tree after Rule 1 has fired as shown in FIG. 24) is derived from Layer 1 (i.e., the Source tree as shown in FIG. 24) after all the rules have fired. Links can be maintained between the different layers as shown in FIG. 25. These links make it possible to trace the cascading behaviour of multiple rules firing. In this case, it is possible to determine that the phrase structure in the final layer is a descendent of two particular input nodes in the source layer. The copy of the validated element is directly linked to the source layer input nodes. Whenever the final output layer is changed (as a result of rules firing), the system recourses down through the layer dependencies to find the originating source layer nodes. It then looks for any validation structures. If validations exist they are tested against the new output and the performance metrics updated accordingly. In this way, performance metrics can be maintained in real-time.

Thus, the embodiments of the present invention facilitate multiple rule development for text analytics that ensure all phrases and variants of text are obtained from implementation of a rule, identification and resolution of conflicts between two or more rules, and providing an understanding of the impact of a rule change on the overall performance of the search results for a document corpus. The GUI features enabled by the invention embodiments provide the combination of a document editor, which displays any selected document from the document corpus, with an editable rule parse tree in a single interface. The features provided by the GUI further allows a user to select a hit within a hit list displayed by the GUI and automatically open an editable version of document associated with the hit (e.g., to switch from one document to another), along with a token parse tree associated with the document. The GUI further facilitates the automatic construction of a rule, as well as revising or specializing the rule, and an automatic population of a hit list showing how that rule is applied to the document corpus. The GUI also allows the user to switch between documents and see the hit list associated with each document. In addition, the GUI facilitates the automatic updating of all hit lists, across all documents, when a rule is applied.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Perl, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for applying text analytics rules to a corpus of documents, the method comprising:

facilitating selection of a document from the corpus of documents within a graphical user interface (GUI), wherein the GUI opens the selected document to display text of the selected document and also displays a token parse tree that lists tokens corresponding to text components of the document, wherein each token identifies an individual word, one or more numbers, or a punctuation mark and wherein each token is individually selectable via the GUI;

facilitating construction of a text analytics rule, via the GUI, by user selection of at least one token and at least one corresponding token component from the token parse tree;

in response to a user selecting the at least one token and the at least one corresponding token component from the token parse tree to facilitate construction of the text analytics rule, applying the constructed text analytics rule to the corpus of documents and providing a list of matching documents or hits via the GUI, the list of matching documents or hits including a listing of matching text components from of the corpus of documents that are associated with tokens that comply with the constructed text analytics rule, the listing of matching text components including, on each line, the identified text component that matches or complies with the text analytics rule as well as preceding text components and post text components in relation to a matching text component; and presenting text of the selected document within a first window of the GUI, the token parse tree for the selected document in a second window of the GUI, and the list of matching documents or hits in a third window of the GUI so as to facilitate visualization of information within the first, second and third windows simultaneously within a single display, none of the displayed windows obstructing a view of any other window of the displayed windows;

wherein a change by user selection of at least one other token and at least one other corresponding token component from the token parse tree for the selected document results in the construction of a different text analytics rule and also a modified list of matching documents or hits via the GUI.

2. The method of claim 1, wherein each token of the token parse tree is expandable to display corresponding token components associated with the token, the corresponding token components for each token comprising different types of information in relation to the associated corresponding text component and its location within the selected document.

3. The method of claim 2, further comprising:
in response to a user selecting a text component of the displayed text for the selected document, expanding a token associated with the selected text component, via the GUI, to initiate construction of a rule at the expanded token.

4. The method of claim 2, further comprising:
facilitating, via the GUI, modification of the text analytics rule by at least one of selection of one or more new token components from the token parse tree and deletion of one or more previously selected token components from the token parse tree; and
in response to the modification of the text analytics rule, providing a modified list of matching documents or hits via the GUI, the modified list of matching documents or hits comprising a list of text components from the corpus of documents that are associated with tokens that comply with the modified text analytics rule.

5. The method of claim 4, wherein the facilitation of a text analytics rule modification via the GUI further comprises:
facilitating construction of a new token that combines a plurality of tokens of the token parse tree so as to create a text analytics rule that combines a plurality of text components as a single phrase.

6. The method of claim 1, further comprising:
facilitating, via the GUI, selection of a hit from the list of matching documents or hits that is associated with a second selected document within the corpus of documents that is different from the selected document; and
in response to selection of the hit from the list of matching documents or hits, opening the second selected document within the GUI so as to display text of the second selected document and also a token parse tree that lists tokens associated with text components of the second selected document.

7. The method of claim 6, wherein a plurality of selected documents are simultaneously open in the GUI to facilitate construction of a plurality of text analytics rules utilizing the token parse trees associated with the select documents such that a plurality of lists of matching documents or hits are provided, wherein each list matching documents or hits comprises a list of text components from of the corpus of documents that are associated with tokens that comply with the constructed text analytics rule of a corresponding selected document.

8. The method of claim 7, further comprising:
applying a constructed text analytics rule to the corpus of documents utilizing a token parse tree associated with one of the selected documents, wherein the application of the constructed text analytics rule to the corpus of documents results in a modification to a number of hits in at least one list of matching documents or hits for a constructed text analytics rule associated with another selected document.

9. The method of claim 1, further comprising:
providing, via the GUI, a performance indication in relation to an ability of the constructed text analytics rule to provide hits within the list of matching documents or hits that are designated as valid for the document corpus.

10. The method of claim 9, wherein the performance indication is determined by a comparison of a number of tokens in the list of matching documents or hits compared to a number of tokens from the corpus of documents that do not currently conform to any text analytics rule.

11. A system for applying text analytics rules to a corpus of documents, the system comprising a processor configured with logic to:
facilitate selection of a document from the corpus of documents within a graphical user interface (GUI), wherein the selected document is opened to display text of the selected document within the GUI and to further display a token parse tree that lists tokens corresponding to text components of the document, wherein each token identifies an individual word, one or more numbers, or a punctuation mark and wherein each token is individually selectable via the GUI;
facilitate construction of a text analytics rule, via interaction with the GUI, by user selection of at least one token and at least one corresponding token component from the token parse tree;
in response to a user selecting the at least one token and the at least one corresponding token component from the token parse tree to facilitate construction of the text analytics rule, apply the constructed text analytics rule to the corpus of documents and provide a list of matching documents or hits via the GUI, the list of matching documents or hits including a listing of matching text components from the corpus of documents that are associated with tokens that comply with the constructed text analytics rule, the listing of matching text components including, on each line, the identified text component that matches or complies with the text analytics rule as well as preceding text components and post text components in relation to the matching text component; and
present text of the selected document within a first window of the GUI, the token parse tree for the selected document in a second window of the GUI, and the list of matching documents or hits in a third window of the GUI so as to facilitate visualization of information within the first, second and third windows simultaneously within a single display, none of the displayed windows obstructing a view of any other window of the displayed windows
wherein a change by user selection of at least one other token and at least one other corresponding token component from the token parse tree for the selected document results in the construction of a different text analytics rule and also a modified list of matching documents or hits via the GUI.

12. The system of claim 11, wherein each token of the token parse tree is expandable to display corresponding token components associated with the token, the corresponding token components for each token comprising different types of information in relation to the associated text component and its location within the selected document, and the processor is further configured with logic to expand a token associated with the selected text component via the GUI, in response to a user selecting a corresponding text component of the displayed text for the selected document, so as to initiate construction of a rule at the expanded token.

13. The system of claim 11, wherein the processor is further configured with logic to:
facilitate, via the GUI, modification of the text analytics rule by at least one of selection of one or more new token components from the token parse tree and deletion of one or more previously selected token components from the token parse tree; and in response to the modification of the text analytics rule, provide a modified list of matching documents or hits via the GUI, the modified list of matching documents or hits comprising a list of text components from the corpus of documents that are associated with tokens that comply with the modified text analytics rule.

14. The system of claim 13, wherein the processor logic facilitating a text analytics rule modification via the GUI further comprises facilitating construction of a new token that combines a plurality of tokens of the token parse tree so as to create a text analytics rule that combines a plurality of text components as a single phrase.

15. The system of claim 11, wherein the processor is further configured with logic to:
facilitate, via the GUI, selection of a hit from the list of matching documents or hits that is associated with a second selected document within the corpus of documents that is different from the selected document; and
in response to selection of the hit from the list of matching documents or hits, open the second selected document within the GUI so as to display text of the second selected document and also a token parse tree that lists tokens associated with text components of the second selected document.

16. A computer program product for applying text analytics rules to a corpus of documents, the computer program product comprising:
a computer readable storage device comprising hardware having computer readable program code embodied therewith, the computer readable program code configured to:
facilitate selection of a document from the corpus of documents within a graphical user interface (GUI), wherein the selected document is opened to display text of the selected document within the GUI and to further display a token parse tree that lists tokens corresponding to text components of the document, wherein each token identifies an individual word, one or more numbers, or a punctuation mark and wherein each token is individually selectable via the GUI;
facilitate construction of a text analytics rule, utilizing the GUI, by user selection of at least one token and at least one corresponding token component from the token parse tree;
in response to a user selecting the at least one token and the at least one corresponding token component from the token parse tree to facilitate construction of the text analytics rule, apply the constructed text analytics rule to the corpus of documents and provide a list of matching documents or hits via the GUI, the list of matching documents or hits including a listing of matching text components from the corpus of documents that are associated with tokens that comply with the constructed text analytics rule, the listing of matching text components including, on each line, the identified text component that matches or complies with the text analytics rule as well as preceding text components and post text components in relation to the matching text component; and
present text of the selected document for display within a first window of the GUI, present the token parse tree for the selected document for display in a second window of the GUI, and present the list of matching documents or hits for display in a third window of the GUI so as to facilitate visualization of information within the first, second and third windows simultaneously within a single display, none of the displayed windows obstructing a view of any other window of the displayed windows;
wherein a change by user selection of at least one other token and at least one other corresponding token component from the token parse tree for the selected document results in the construction of a different text analytics rule and also a modified list of matching documents or hits via the GUI.

17. The computer readable program product of claim 16, wherein each token of the token parse tree is expandable to display corresponding token components associated with the token, the corresponding token components for each token comprising different types of information in relation to the associated corresponding text component and its location within the selected document.

18. The computer readable program product of claim 17, wherein the computer readable code is further configured to expand a token associated with the selected text component via the GUI, in response to a user selecting the text component of the displayed text for the selected document, so as to initiate construction of a rule at the expanded token.

19. The computer readable program product of claim 17, wherein the computer readable code is further configured to:
facilitate, via the GUI, modification of the text analytics rule by at least one of selection of one or more new token components from the token parse tree and deletion of one or more previously selected token components from the token parse tree; and
in response to the modification of the text analytics rule, provide a modified list of matching documents or hits via the GUI, the modified list of matching documents or hits comprising a list of text components from documents of the corpus that are associated with tokens that comply with the modified text analytics rule.

20. The computer readable program product of claim 19, wherein the computer readable program code is further configured to facilitate a text analytics rule modification via the GUI further by facilitating construction of a new token that combines a plurality of tokens of the token parse tree so as to create a text analytics rule that combines a plurality of text components as a single phrase.

21. The computer readable program product of claim 16, wherein the computer readable program code is further configured to:
facilitate, via the GUI, selection of a hit from the hit list of matching documents or hits that is associated with a second selected document within the corpus of documents that is different from the selected document; and
in response to selection of a hit from the list of matching documents or hits, open the second selected document within the GUI so as to display text of the second selected document and also a token parse tree that lists tokens associated with text components of the second selected document.

22. The computer readable program product of claim 21, wherein the computer readable program code is further configured to facilitate a plurality of selected documents being simultaneously open in the GUI to facilitate construction of a plurality of text analytics rules utilizing the token parse trees associated with the select documents such that a plurality of lists of matching documents or hits are provided, wherein each list of matching documents or hits comprises a list of text components from the corpus of documents that are associated with tokens that comply with the constructed text analytics rule of a corresponding selected document.

23. The computer readable program product of claim 16, wherein the computer readable program code is further configured to:
 apply a constructed text analytics rule to the corpus of documents utilizing a token parse tree associated with one of the selected documents, wherein the application of the constructed text analytics rule to the corpus of documents results in a modification to a number of hits in at least one list of matching documents or hits for a constructed text analytics rule associated with another selected document.

\* \* \* \* \*